(12) United States Patent
Shimizu

(10) Patent No.: US 11,827,132 B2
(45) Date of Patent: Nov. 28, 2023

(54) ARMREST DEVICE

(71) Applicant: TS TECH CO., LTD., Asaka (JP)

(72) Inventor: Takahiro Shimizu, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 18/077,754

(22) Filed: Dec. 8, 2022

(65) Prior Publication Data

US 2023/0150409 A1 May 18, 2023

Related U.S. Application Data

(63) Continuation of application No. 17/225,314, filed on Apr. 8, 2021, now Pat. No. 11,535,135, which is a continuation of application No. 16/585,031, filed on Sep. 27, 2019, now Pat. No. 10,994,639, which is a continuation of application No. 15/749,809, filed as
(Continued)

(30) Foreign Application Priority Data

Aug. 4, 2015 (JP) ................. 2015-154076

(51) Int. Cl.
| | |
|---|---|
| *B60J 5/04* | (2006.01) |
| *B60N 2/75* | (2018.01) |
| *B60N 3/00* | (2006.01) |
| *B60Q 3/217* | (2017.01) |
| *B60Q 3/233* | (2017.01) |

(52) U.S. Cl.
CPC ............... *B60N 2/77* (2018.02); *B60N 2/773* (2018.02); *B60N 2/777* (2018.02); *B60N 2/78* (2018.02); *B60N 2/797* (2018.02); *B60N 3/00* (2013.01); *B60Q 3/217* (2017.02); *B60Q 3/233* (2017.02); *B60J 5/0461* (2013.01)

(58) Field of Classification Search
CPC .......... B60N 2/77; B60N 2/773; B60N 2/777; B60N 2/78; B60N 2/797; B60N 3/00; B60Q 3/217; B60Q 3/233; B60J 5/0461; B60R 21/0428
USPC ......................................................... 296/153
See application file for complete search history.

(56) References Cited

U.S. PATENT DOCUMENTS

| | | | | |
|---|---|---|---|---|
| 2,325,292 A | * | 7/1943 | Westrope ................. | B60N 2/77 |
| | | | | 296/153 |
| 2,760,813 A | * | 8/1956 | Colm ....................... | B60N 2/78 |
| | | | | 296/68.1 |
| 5,845,965 A | | 12/1998 | Heath | |

(Continued)

FOREIGN PATENT DOCUMENTS

| | | |
|---|---|---|
| DE | 3930270 | 3/1991 |
| DE | 102008036565 | 4/2010 |

(Continued)

OTHER PUBLICATIONS

International Search Report for PCT/JP2016/003591, dated Oct. 18, 2016, 4 pages.

*Primary Examiner* — Pinel E Romain
(74) *Attorney, Agent, or Firm* — Dority & Manning, P.A.

(57) ABSTRACT

Provided is an armrest device that can be positioned in an appropriate position suitable for the build of the vehicle occupant. The armrest device comprises an interior member provided on an inboard side of a vehicle door, and an armrest main body supported by the interior member so as to be moveable between an initial position and a projecting position more inboard and forward than the initial position.

20 Claims, 17 Drawing Sheets

Related U.S. Application Data application No. PCT/JP2016/003591 on Aug. 3, 2016, now Pat. No. 10,457,178.

(56) References Cited

U.S. PATENT DOCUMENTS

| | | | |
|---|---|---|---|
| 5,967,594 | A | 10/1999 | Ramanujam |
| 6,568,743 | B1 | 5/2003 | Jayasuriya et al. |
| 6,837,544 | B2 | 1/2005 | Boernchen et al. |
| 6,905,163 | B2 | 6/2005 | Boemchen et al. |
| 7,753,424 | B2 | 7/2010 | Sommer et al. |
| 8,419,246 | B2 | 4/2013 | Hayashi et al. |
| 9,216,675 | B2 * | 12/2015 | Jayasuriya .......... B60R 13/0243 |
| 9,233,660 | B1 | 1/2016 | Farooq et al. |
| 9,481,276 | B2 | 11/2016 | Farooq |
| 9,987,957 | B2 | 6/2018 | Cavalieri |
| 10,421,379 | B2 | 9/2019 | Ligi |
| 2004/0075297 | A1 * | 4/2004 | Bornchen .............. B60N 2/763 |
| | | | 296/153 |
| 2004/0164577 | A1 | 8/2004 | Shabana et al. |
| 2006/0163933 | A1 * | 7/2006 | Radu ..................... B60N 2/767 |
| | | | 297/411.35 |
| 2009/0079228 | A1 | 3/2009 | Sturt et al. |
| 2012/0257402 | A1 | 10/2012 | Hayashi et al. |
| 2017/0210275 | A1 | 7/2017 | Kubo |
| 2018/0162250 | A1 | 6/2018 | Dinant et al. |
| 2018/0186253 | A1 | 7/2018 | Fitzpatrick |
| 2018/0222293 | A1 | 8/2018 | Thomas |

FOREIGN PATENT DOCUMENTS

| | | | |
|---|---|---|---|
| EP | 0669222 | | 8/1995 |
| EP | 1544028 | | 6/2005 |
| GB | 516257 | | 12/1939 |
| JP | H02114538 | | 9/1990 |
| JP | H11321419 | | 11/1999 |
| JP | 2001270368 | | 10/2001 |
| JP | 2003341405 | | 12/2003 |
| JP | 2004196126 | | 7/2004 |
| JP | 2005096528 | | 4/2005 |
| JP | 2012121420 | | 6/2012 |
| WO | WO-2006119741 A1 * | 11/2006 | ........... B60N 2/4633 |

* cited by examiner

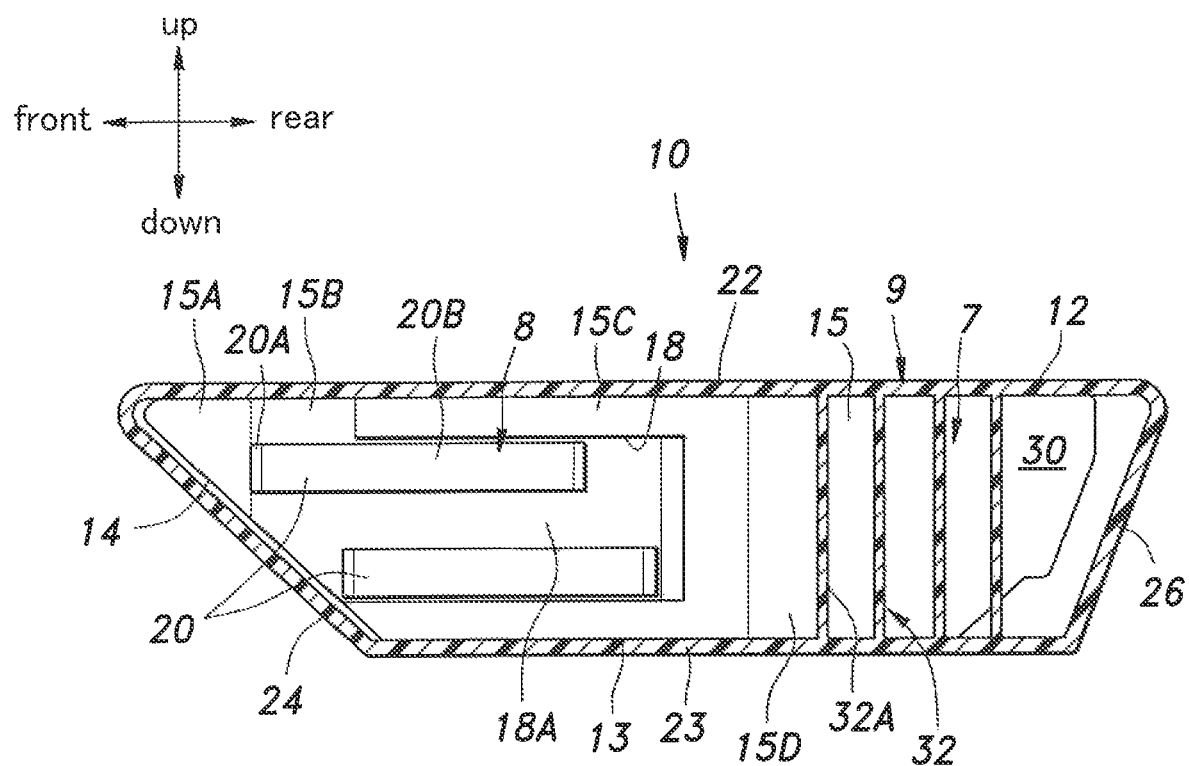

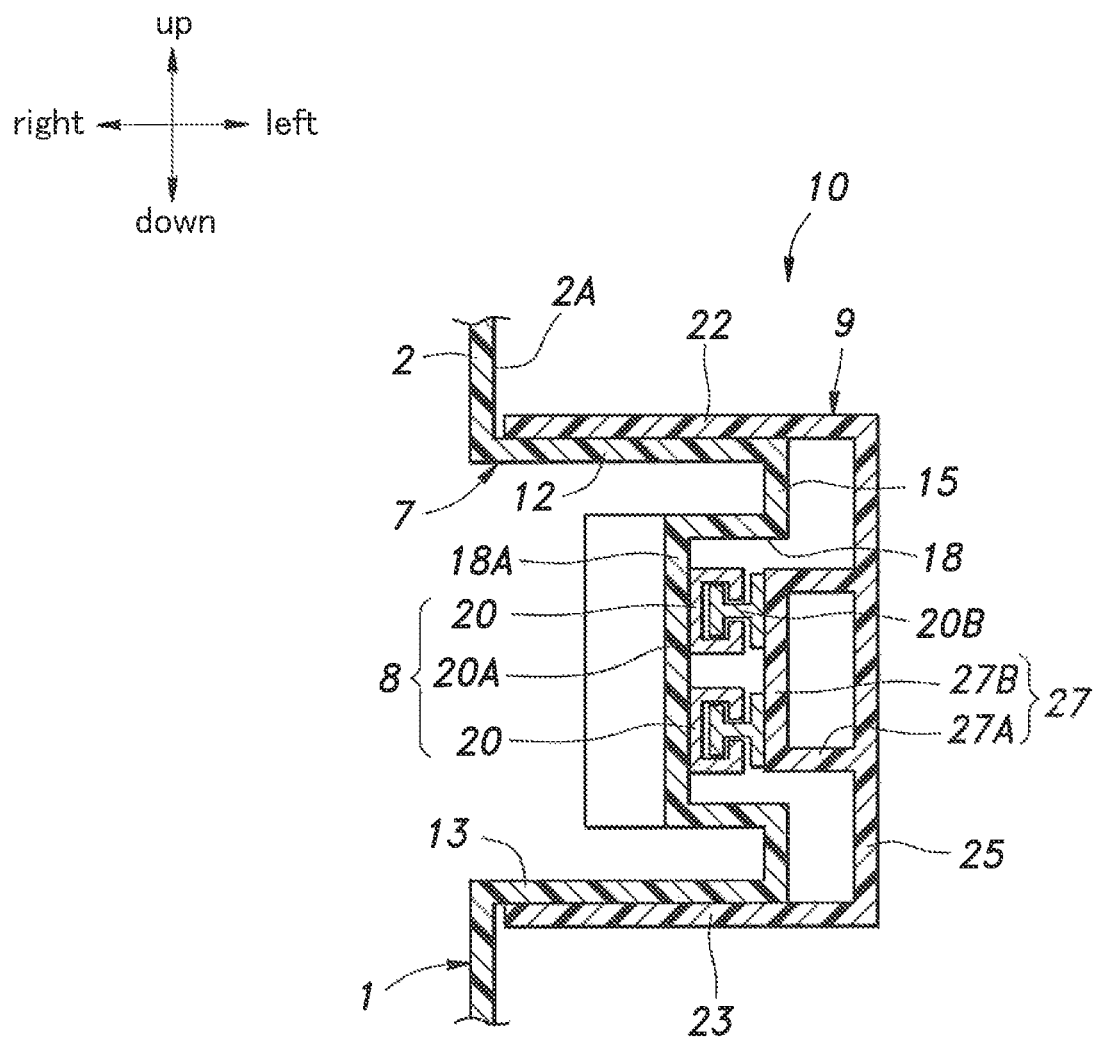

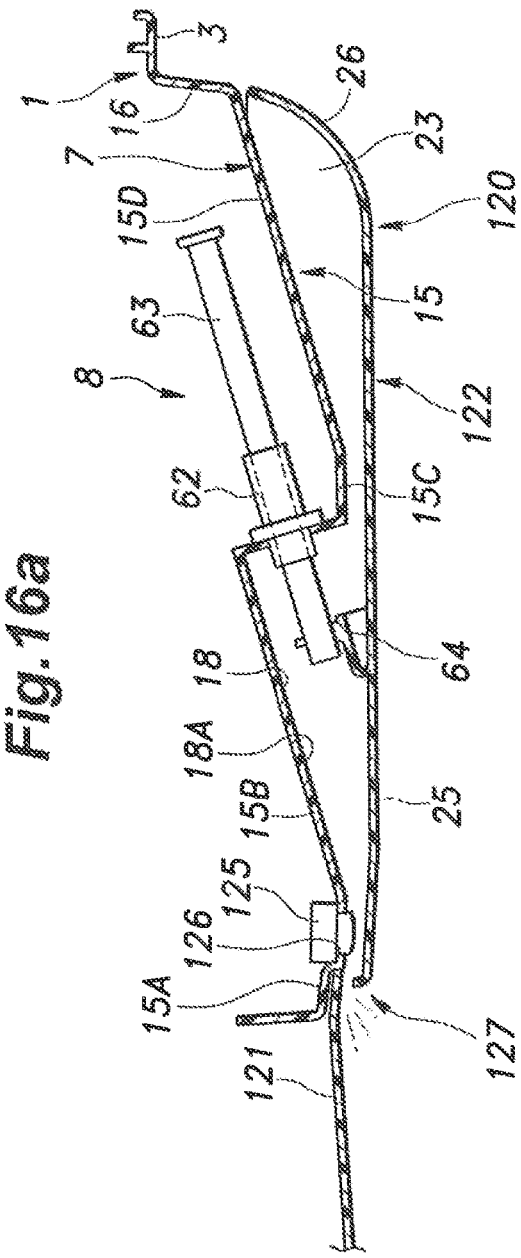
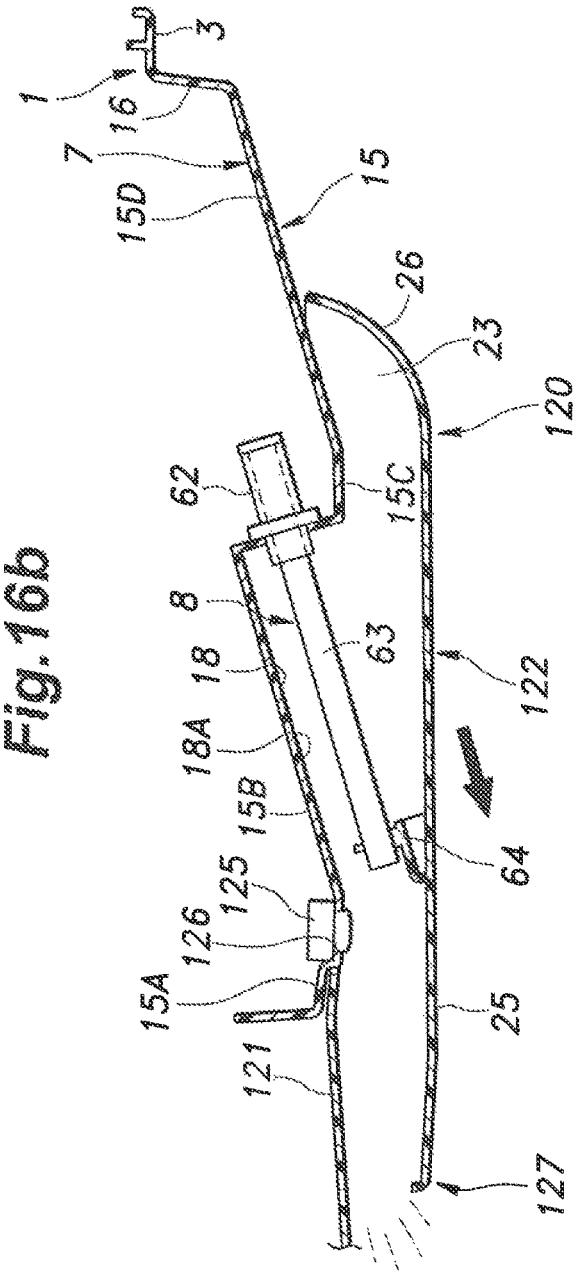

ARMREST DEVICE

CROSS REFERENCE TO RELATED APPLICATIONS

This application is a continuation of U.S. patent application Ser. No. 17/225,314 having a filing date of Apr. 8, 2021, which is a continuation of U.S. patent application Ser. No. 16/585,031 having a filing date of Sep. 27, 2019 (now U.S. Pat. No. 10,994,639 issued on May 4, 2021), which claims priority to U.S. patent application Ser. No. 15/749,809 having a filing date of Feb. 2, 2018 (now U.S. Pat. No. 10,457,178 issued on Oct. 29, 2019), which is the U.S. National Stage entry of International Application No. PCT/JP2016/003591 filed under the Patent Cooperation Treaty and having a filing date of Aug. 3, 2016, which claims priority to Japanese Patent Application No. 2015-154076 having a filing date of Aug. 4, 2015, all of which are incorporated herein by reference

TECHNICAL FIELD

The present invention relates to an armrest device provided on a door of a vehicle.

BACKGROUND ART

It is known to provide an armrest on a door of a vehicle in a moveable manner so that the position of the armrest may be adjusted according to the position of the elbow of a vehicle occupant who may be of a particular build. For example, in a certain conventional armrest device, an armrest is attached to a door so as to be movable in a lateral direction of the vehicle (see Patent Document 1, for example). In other conventional armrest devices, an armrest is mounted on a door so as to be movable in a vertical direction with respect to the door (see Patent Document 2, for example), an armrest is mounted on a door so as to be movable in a fore and aft direction with respect to the door (see Patent Document 3, for example), and a rear end part of an armrest is rotatably mounted on a door so as to be rotatable around a rotational center line extending vertically with respect to the door (see Patent Document 4, for example).

PRIOR ART DOCUMENT(S)

Patent Document(s)

Patent Document 1: JPH11-321419A
Patent Document 2: JP2004-196126A
Patent Document 3: JP2005-96528A
Patent Document 4: JP2001-270368A

SUMMARY OF THE INVENTION

Task to be Accomplished by the Invention

However, the modes of movement of the conventional armrests mentioned above do not take into account the fore and aft position of the occupant or, in particular, the fore and aft position of the torso of the occupant. Therefore, the armrest may not be positioned in an optimum fashion for each particular vehicle occupant. A vehicle driver of a small build tends to position his or her torso in a more front position than a driver of a large build in order to optimize the distances to the steering wheel and the accelerator pedal. This is particularly the case when the seat is adjustable in the fore and aft direction. In such a case, the elbow of the driver of a small build is positioned in a more forward position than that of a driver of a large build. Obviously, the elbow of the driver of a small build is positioned more inboard than that of a driver of a large build. Therefore, for a driver of a small build, it is desirable to position the armrest in a relatively forward and inward position.

In view of such a background, a primary object of the present invention is to provide an armrest device that can be positioned in an appropriate position according to the physique of the occupant.

Means to Accomplish the Task

To achieve such an object, the present invention provides an armrest device (10), comprising: an interior member (1) provided on an inboard side of a vehicle door, and an armrest main body (9) supported by the interior member so as to be moveable between an initial position and a projecting position more inboard and forward than the initial position.

According to this aspect, because the projecting position of the armrest main body is more inboard and forward than the initial position, the armrest main body can be positioned at an optimum position so as to suit the build of the vehicle occupant.

Preferably, the armrest main body is configured to move between the initial position and the projecting position as a translational movement.

According to this aspect, the armrest main body can be maintained at a fixed attitude suitable for the vehicle occupant in both the initial position and the projecting position.

Preferably, the armrest main body is configured to move linearly between the initial position and the projecting position as a translational movement.

Thereby, the mode of movement of the armrest main body is simplified, and the support structure for the armrest main body can be simplified.

According to a preferred embodiment of the present invention, the interior member includes a main body portion (2) extending along the inboard side of the vehicle door and an armrest base portion (7) projecting in an inboard direction from the main body portion and defining a resting surface (12) facing upward, and the armrest main body is provided with an upper wall portion (22) slidably positioned on the resting surface. The armrest base portion may be integrally formed with the main body portion of the interior member, or, alternatively, may consist of a member separate from the main body portion of the interior member and attached to the main body portion of the interior member.

Thereby, in the case of a side crash, the load on the vehicle occupant can be minimized.

Preferably, the armrest base portion is provided with a base side wall portion (15) extending vertically on an inboard side thereof, and the armrest main body is provided with a main body side wall portion (25) opposing the base side wall portion in a spaced apart relationship, at least one of opposing surfaces of the base side wall portion and the main body side wall portion being provided with a load absorbing member (32) for absorbing an impact load.

Thereby, the impact of a side crash acting upon the vehicle occupant can be reduced.

Preferably, the load absorbing member includes a rib (32A) projecting from at least one of the opposing surfaces of the base side wall portion and the main body side wall portion so as to be deformable under an impact load.

Thereby, the load absorbing member can be formed as a simple structure. By varying the stiffness of the rib, the load to be absorbed can be adjusted in a simple manner.

Preferably, the armrest main body is supported by the armrest base portion via a slide mechanism (8).

Thereby, the armrest main body can be supported by the armrest base portion so as to be able to undergo a translational movement by using a simple structure.

Preferably, the slide mechanism includes a rail (20A) attached to one of the armrest main body and the armrest base portion, and a slider (20B) attached to the other of the armrest main body and the armrest base portion so as to be slidably supported by the rail.

Thereby, the slide mechanism can be formed by using a simple structure.

Preferably, the armrest base portion is provided with a base side wall portion extending vertically on an inboard side thereof, and the base side wall portion is formed with a recess (18) recessed in an outboard direction, a side surface (18A) of the recess facing in the inboard direction extending in a direction of the translational movement of the armrest main body and having the rail mounted thereon.

Thereby, without regard to the extending direction of the base side wall portion, the orientation of the rail can be freely determined by the side surface of the recess. Therefore, the surface area of the resting surface can be maximized while the direction of the translational movement can be freely selected.

Preferably, the slide mechanism comprises a guide sleeve (62) connected to one of the armrest main body and the armrest base portion, and a rod (63) connected to the other of the armrest main body and the armrest base portion so as to be slidably supported by the guide sleeve.

Thereby, the slide mechanism can be formed by using a simple structure.

Preferably, the armrest base portion is provided with a base side wall portion extending vertically on an inboard side thereof, and a large part of the guide sleeve is positioned on an outboard side of the base side wall portion.

Thereby, without regard to the extending direction of the base side wall portion, the orientation of the rail can be freely determined. Therefore, the surface area of the resting surface can be maximized while the direction of the translational movement can be freely selected.

Preferably, a switch portion (5) is provided on the main body portion of the interior member so as to project in the inboard direction to support a switch box, and the armrest base portion is positioned behind the switch portion in a spaced apart relationship.

Thereby, the armrest main body is prevented from interfering with the switch portion when the armrest main body moves to the projecting position.

Preferably, a switch portion (5) is provided on the interior member so as to project in an inboard direction to support a switch box, and an extension projects from an inboard side of the switch portion in the inboard direction in such a manner that a front edge of an inboard side of the armrest main body extends continuously with a projecting edge on an inboard side of the extension in a fore and aft direction when the armrest main body is in the projecting position.

Because the armrest main body extends continuously from the rear edge of the extension in the projecting position, the resting surface jointly defined by the armrest main body and the extension for supporting an elbow of a vehicle occupant can be maximized. Furthermore, the armrest main body in the projecting position presents a unified appearance jointly with the interior member so that the external appearance is enhanced.

Preferably, a surface of the inboard side of the armrest main body facing in the inboard direction is flush with a surface of the projecting edge of the extension facing in the inboard direction.

Thereby, the armrest main body in the projecting position presents a unified appearance jointly with the interior member so that the external appearance can be enhanced.

Preferably, an upper part of the extension is formed with a pocket having an upwardly facing opening.

Thereby, the extension can be used as a pocket.

Preferably, a part of the interior member opposing the armrest main body is provided with a light source.

Thereby, the light emitted from the light source is reflected by the interior member and the armrest main body, and leaks out from a gap between the interior member and an opposing edge of the armrest main body so that an edge part of the armrest main body can be favorably illuminated. This illuminating light leaking into the passenger compartment changes depending on the position of the armrest main body relative to the interior member owing to the change in the size of the gap between the interior member and the armrest main body. Therefore, the vehicle occupant can determined the position of the armrest main body from the intensity of illumination on the edge part of the armrest main body.

Preferably, the light source is provided in a position of the interior member that opposes an edge part of the armrest main body in the initial position.

Thereby, the light from the light source passing through the gap between the interior member and the edge part of the armrest main body can be leaked to the passenger compartment in an efficient manner.

Effect of the Invention

Thus, the present invention provides an armrest device that can be positioned in an appropriate position suitable for the build of the vehicle occupant.

BRIEF DESCRIPTION OF THE DRAWINGS

FIG. 5 is a sectional view taken along line V-V of FIG. 4a;

FIG. 6 is a sectional view taken along line VI-VI of FIG. 4a;

FIG. 16a is a horizontal sectional view of an armrest device according to a sixth embodiment of the present invention;

FIG. 16b is a horizontal sectional view of an armrest device according to a sixth embodiment of the present invention.

DESCRIPTION OF THE PREFERRED EMBODIMENT(S)

In the following are described various embodiments of the armrest device of the present invention as applied to an interior member of a vehicle door with reference to the appended drawings.

First Embodiment

Figure 1:
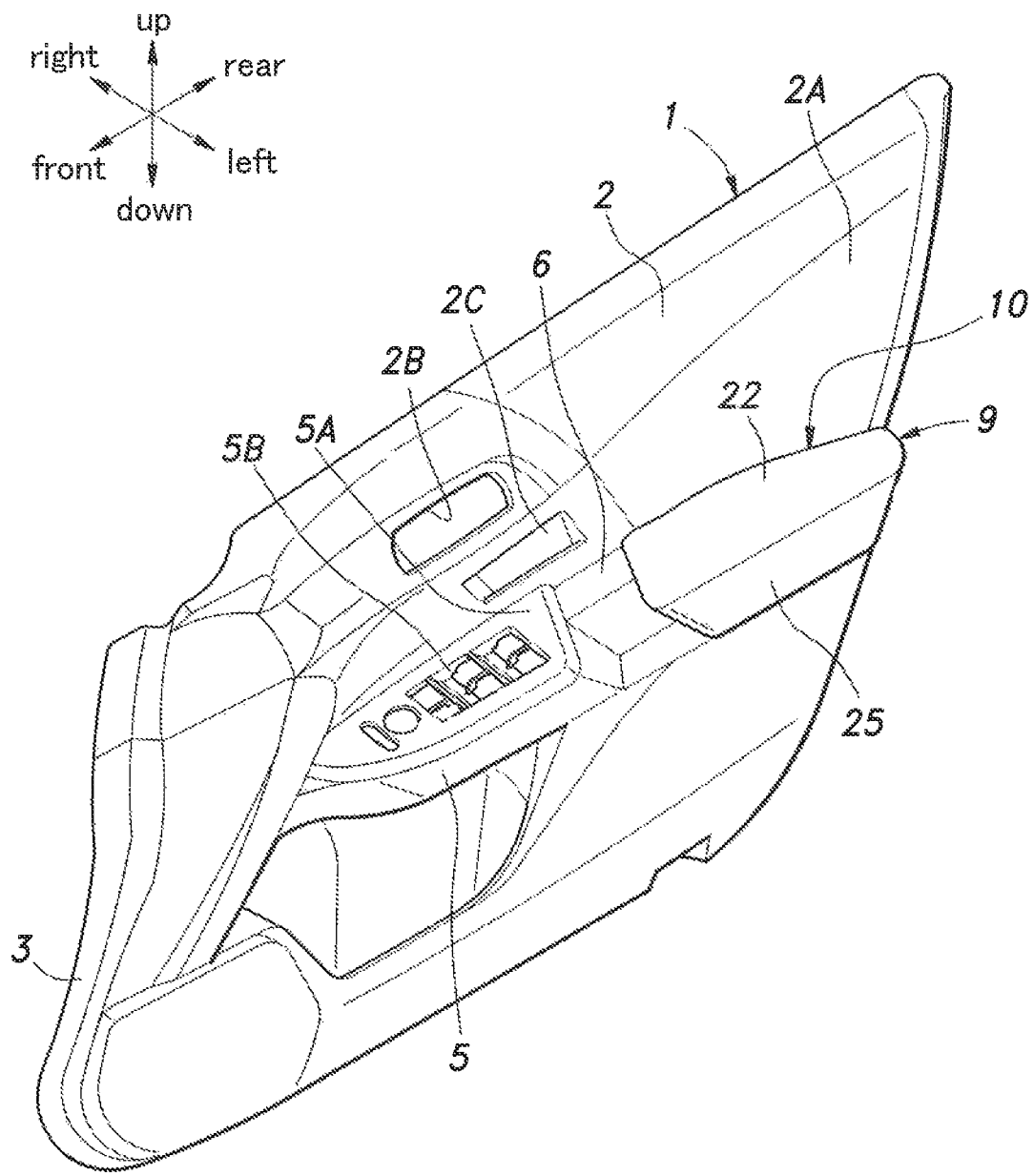
FIG. 1 is a perspective view of a vehicle door according to a first embodiment of the present invention.

As shown in FIG. 1, a door adjacent to the right front seat or the driver's seat is provided with an interior member 1 which covers an inboard side (left side) of a lower part of a door panel made of sheet steel. The interior member 1 is generally formed by a plate member, and includes a main body portion 2 having a major plane facing in the lateral direction when the door is closed, and a peripheral part 3 surrounding the main body portion 2. The inboard side of the main body portion 2 of the interior member 1 is referred to a surface 2A. The peripheral part 3 is offset in the outboard direction relative to the main body portion 2, and abuts the door panel.

An upper part of the main body portion 2 is formed with an upper opening 2B passed through the main body portion 2 in the thickness-wise direction. A door handle attached to the door panel is positioned in the upper opening 2B. A grip portion 2C is formed in a part of the main body portion 2 located below the upper opening 2B. The grip portion 2C consists of a recess formed in the main body portion 2 recessed in both the outboard direction and the downward direction. By engaging the grip portion 2C with fingers, the vehicle occupant is enabled to open and close the door.

A vertically intermediate part of the main body portion 2 is formed with a switch portion 5, a connecting portion 6 and an armrest base portion 7 in that order from the front to the rear. The switch portion 5, the connecting portion 6 and the armrest base portion 7 are formed as protrusions bulging in the inboard direction, and internally define a space opening out in the outboard direction. The switch portion 5, the connecting portion 6 and the armrest base portion 7 all extend in the fore and aft direction, and are connected to one another in the aforementioned order. The switch portion 5, the connecting portion 6 and the armrest base portion 7 jointly form an armrest device 10.

The switch portion 5 is formed in the shape of a box extending in the fore and aft direction. The switch portion 5 receives a switch box (not shown in the drawings) incorporated with switches for power windows and a door lock device. Switch keys provided in the switch box are exposed upward from respective switch openings 5B formed in an upper wall portion 5A of the switch portion 5.

As shown in FIGS. 3 to 6, the armrest base portion 7 includes a base upper wall portion 12 and a base lower wall portion 13 both extending horizontally in the inboard direction from the main body portion 2, a base front wall portion 14 extending from the main body portion 2 and connecting the front edges of the base upper wall portion 12 and the base lower wall portion 13 to each other, and a base side wall portion 15 connecting the projecting edges of the base upper wall portion 12, the base lower wall portion 13 and the base front wall portion 14 to one another. The width of the base upper wall portion 12 and the base lower wall portion 13 progressively diminishes in the rearward direction in plan view. In other words, the projecting length of the base upper wall portion 12 and the base lower wall portion 13 is smaller in the rear part thereof than in the front part thereof. The front edges of the base upper wall portion 12 and the base lower wall portion 13 and the base front wall portion 14 incline forward as one moves in the inboard direction. The front edge of the base lower wall portion 13 is offset to the rear relative to the front edge of the base upper wall portion 12 so that the base front wall portion 14 inclines rearward as one moves downward. The base side wall portion 15 inclines in the outboard direction as one moves rearward, and is directly connected to the main body portion 2 at the rear edge thereof.

The base side wall portion 15 includes a first section 15A, a second section 15B, a third section 15C and a fourth section 15D from the front to the rear in that order. The first section 15A and the third section 15C form a substantially same inclination angle relative to the fore and aft direction, and the second section 15B forms a large inclination angle relative to the fore and aft direction than the first section 15A and the third section 15C. Therefore, the third section 15C is offset relative to the first section 15A in the outboard direction. The fourth section 15D forms a larger inclination angle relative to the fore and aft direction than the third section 15C.

The vertically central part of the base side wall portion 15 ranging from the second section 15B to the third section 15C is formed with a receiving hole 18. In the illustrated embodiment, the receiving hole 18 is formed as a recess recessed in the outboard direction. The front hole wall 18A or the front side wall of the receiving hole 18 consists of a planar wall inclining in a forward direction as one moves in the inboard direction. The inclination angle of the front hole wall 18A relative to the fore and aft direction is greater than the inclination angle of the third section 15C relative to the fore and aft direction The armrest base portion 7 may be integrally formed with the main body portion 2 of the interior member 1, or, alternatively, may consist of a separate member from the main body portion 2 of the interior member 1 and connected to the main body portion 2 of the interior member 1. The armrest base portion 7 and the main body portion 2 may be made of plastic material, for instance.

A slide mechanism 8 is attached to the front hole wall 18A. In the illustrated embodiment, the slide mechanism 8 consists of a pair of slide rail devices 20. As shown in FIGS. 5 and 6, each slide rail device 20 includes a linearly extending rail 20A and a slider 20B supported by the rail 20A so as to be slidable in the lengthwise direction of the rail 20A. Preferably, the slider 20B has a certain length in the extending direction of the rail 20A. The slider 20B may consist of a rail member slidably engaging the rail 20A. The rails 20A are attached to the front hole wall 18A so as to extend in the horizontal direction in a mutually vertically spaced apart relationship. Therefore, the sliders 20B linearly slide along the rails 20A horizontally so as to move inwardly as the sliders 20B progress forward.

As shown in FIGS. 3 to 6, the armrest main body 9 includes a main body upper wall portion 22 and a main body lower wall portion 23 consisting of plate members elongated in the fore and aft direction, a main body front wall portion 24 connecting the front edges of the main body upper wall portion 22 and the main body lower wall portion 23 to each other, a main body side wall portion 25 connecting the inboard edges of the main body upper wall portion 22 and the main body lower wall portion 23 to each other, and a main body rear wall portion 26 connecting the rear edges of the main body upper wall portion 22 and the main body lower wall portion 23 to each other. Therefore, the armrest main body 9 is formed as a box having an open end facing in the outboard direction. A connecting portion 27 projects from the outboard surface of the main body side wall portion 25. The connecting portion 27 is provided with a pair of leg piece portions 27A projecting from the main body side wall portion 25 in the outboard direction in a mutually vertically spaced apart relationship, and a plate portion 27B extending between the free ends of the leg piece portions 27. The sliders 20B of the slide mechanism 8 are attached to the plate portion 27B. The plate portion 27B extends substantially in parallel with the front hole wall 18A. The armrest main body 9 is supported by the armrest base portion 7 via the slide mechanism 8 so as to be able to undergo a translational movement along the extending direction of the rails 20A relative to the armrest base portion 7.

The position of the armrest main body when the sliders 20B are at the rear ends of the respective rails 20A and the armrest main body 9 is at the furthest outboard position is referred to as an initial position. See the broken lines in FIG. 2, and FIG. 4a. The position of the armrest main body when the sliders 20B are at the front ends of the respective rails 20A and the armrest main body 9 is at the furthest inboard position is referred to as a projecting position. See the solid lines in FIG. 2, and FIG. 4b. The projecting position of the armrest main body 9 is more inboard and forward than the initial position thereof. The armrest main body 9 is thus configured to undergo a translational movement from the initial position to the projecting position both horizontally and linearly. See white arrows in FIG. 2 and FIG. 4b.

The main body upper wall portion 22 is dimensioned so as to cover the entire area of the base upper wall portion 12 when the armrest main body 9 is in the initial position. In particular, the lateral width of the rear portion of the main body upper wall portion 22 (with respect to the vehicle body) is larger than the lateral width of the rear portion of the base upper wall portion 12. The inclination angle of the main body side wall portion 25 with respect to the fore and aft direction is smaller than the inclination angle of the base side wall portion 15 with respect to the fore and aft direction. In the initial position of the armrest main body 9, the lateral distance between the main body side wall portion 25 and the base side wall portion 15 progressively increases toward the rear. In other words, an internal space 30 is defined between the rear portion of the main body side wall portion 25 and the rear portion of the base side wall portion 15.

As shown in FIGS. 4 and 5, a rear part of the main body side wall portion 25 facing the internal space 30 is provided with a load absorbing member 32 that absorbs an impact load. In the present embodiment, the load absorbing member 32 comprises a plurality of ribs 32A projecting from the main body side wall portion 25. Each rib 32A extends vertically, and has an upper end attached to the lower surface of the main body upper wall portion 22 and a lower end attached to the upper surface of the main body lower wall portion 23. The ribs 32A enhance the stiffness of the armrest main body 9, and prevent undue deformation under the load of an elbow of a vehicle occupant. When subjected to an impact load caused by a side crash, the ribs 32A are compressed and deformed between the base side wall portion 15 and the main body side wall portion 25 so that the impact load is absorbed, and the load acting on the vehicle occupant is reduced. The rib 32A may be damaged or destroyed under the impact load.

The main body upper wall portion 22 is slidably placed on the upper surface of the base upper wall portion 12. Therefore, a load applied from above to the main body upper wall portion 22 is directly transmitted from the main body upper wall portion 22 to the base upper wall portion 12 so that the deformation of the armrest main body 9 is minimized. The upper surface of the base upper wall portion 12 forms a resting surface for supporting the main body upper wall portion 22.

Figure 2:
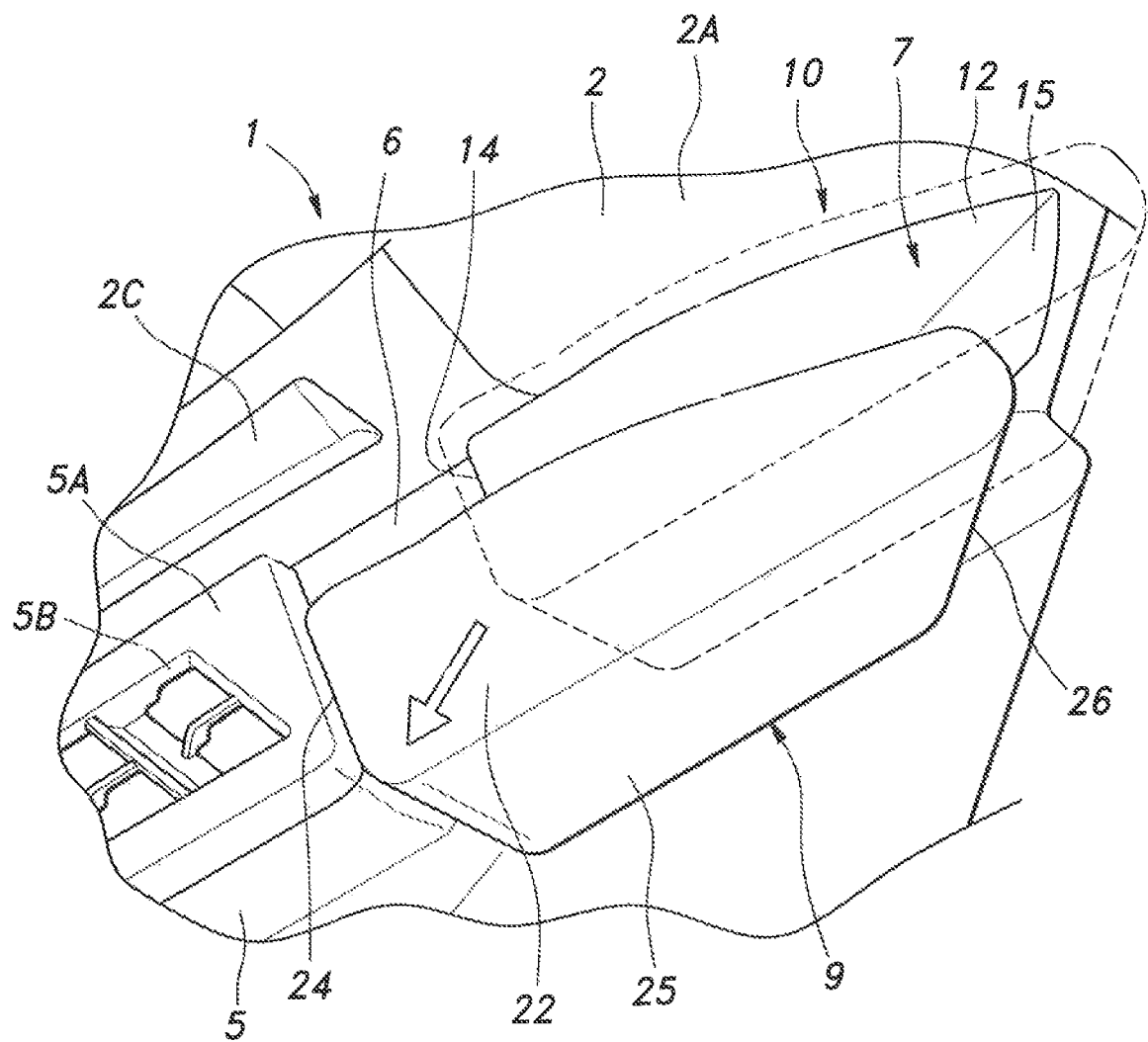
FIG. 2 is a perspective view of the armrest device according to the first embodiment.
Figure 3:
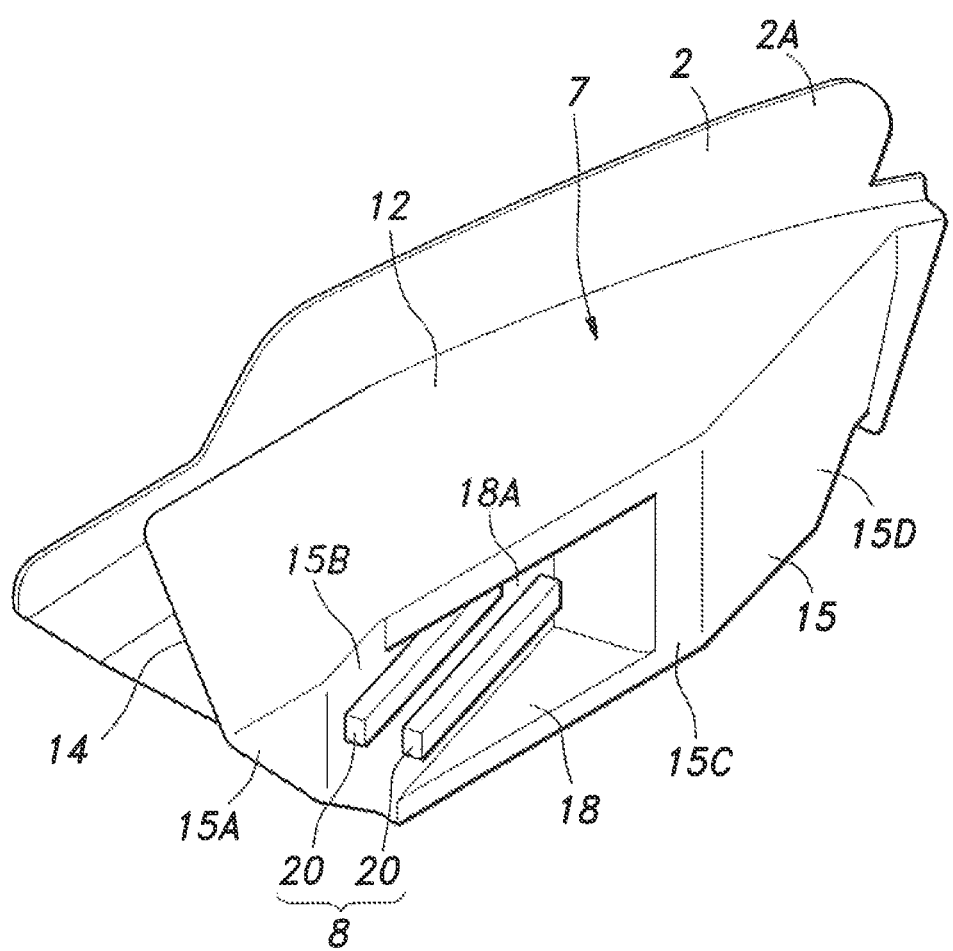
FIG. 3 is a perspective view of an armrest base portion according to the first embodiment.

As shown in FIG. 1 and FIG. 2, the projecting length of the connecting portion 6 from the main body portion 2 of the interior member in the inboard direction is smaller than those of the switch portion 5 and the armrest base portion 7. The connecting portion 6 connects an outboard side of a rear part of the switch portion 5 to the outboard side of the base front wall portion 14. The upper surface of the switch portion 5 is higher than the upper surface of the base upper wall portion 12, and the upper surface of the connecting portion 6 is lower than the upper surface of the base upper wall portion 12. The upper surface of the main body upper wall portion 22 placed on the base upper wall portion 12 is at an approximately same height as the upper surface of the switch portion 5.

When the armrest main body 9 is in the initial position, the main body front wall portion 24 of the armrest main body 9 extends downward from an inboard part of the front edge of the main body upper wall portion 22 so as not to interfere with the connecting portion 6. Further, when the armrest main body 9 is the initial position, the main body front wall portion 24 of the armrest main body 9 is arranged so as to extend along the base front wall portion 14.

Figure 4A:
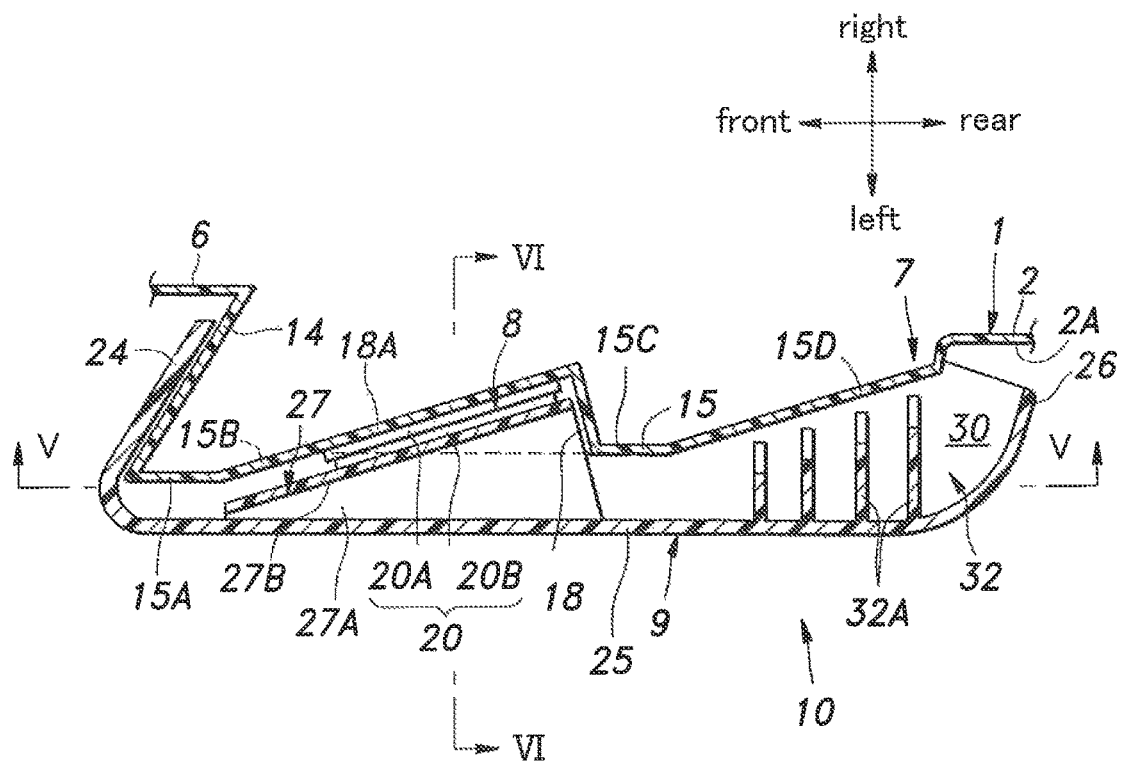
FIG. 4a is a horizontal sectional view of the armrest device according to the first embodiment in an initial position.
Figure 4B:
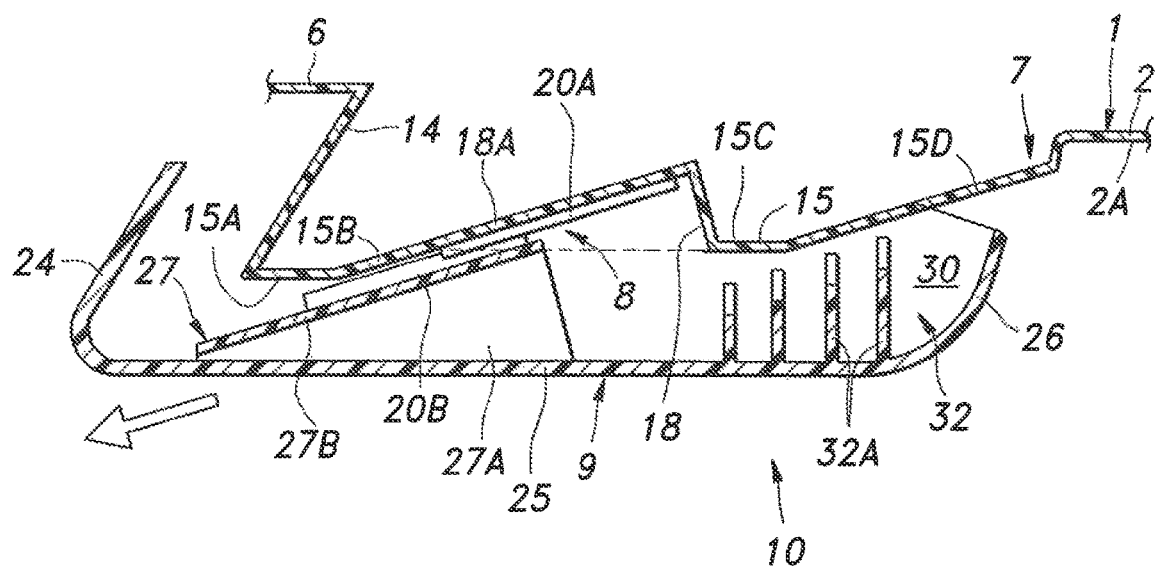
FIG. 4b is a horizontal sectional view of the armrest device according to the first embodiment in a projecting position.

As shown in FIG. 4a, when the armrest main body 9 is in the initial position, the connecting portion 27 of the armrest main body 9 is disposed in the receiving hole 18 of the armrest base portion 7 so that the interference between the connecting portion 27 and the armrest base portion 7 is avoided. As shown in FIG. 4b, when the armrest main body 9 moves to the projecting position, the connecting portion 27 moves out of the receiving hole 18.

When the armrest main body 9 moves from the initial position to the projecting position, the main body rear wall portion 26 and the load absorbing member 32 of the armrest main body 9 move to a more outboard position than the base side wall portion 15 so that the interference between the main body rear wall portion 26 and the base side wall portion 15 is avoided.

As shown in FIG. 2, the armrest main body 9 is disposed so that the main body front wall portion 24 abuts on a rear part of the switch portion 5 in the projecting position. As a result, the upper surface of the main body upper wall portion 22 extends continuously with the upper surface of the switch portion 5. Further, the outboard edge portion of the main body upper wall portion 22 is positioned above the connecting portion 6, and a gap created between the switch portion 5 and the armrest base portion 7 is filled by the armrest main body 9.

The mode of operation of the armrest device 10 described above is now discussed in the following. The armrest device 10 allows a vehicle occupant to position the armrest main body 9 at a desired position between the initial position and the projecting position so as to suit the build of the vehicle occupant, and to place his or her elbow on the main body upper wall portion 22. Since the armrest main body 9 moves forward as it moves in the inboard direction, it is possible to provide a comfortable elbow position to the vehicle occupant. Typically, the smaller the build of the vehicle occupant is, the further forward the seating position of the vehicle occupant is moved so that the distance to the steering wheel and the accelerator pedal may be made appropriate particularly when the fore and aft position of the seat can be adjusted. Also, the smaller the build of the vehicle occupant is, the further away the elbow of the vehicle occupant is positioned. Therefore, it is preferable that the position of the armrest main body 9 moves inboard and forward as the occupant's build decreases. In the armrest device 10 according to the present embodiment, since the armrest main body 9 moves from the initial position to the projecting position inwardly and forwardly with respect to the vehicle body, the armrest main body 9 can be positioned at an appropriate position that suits the build of the vehicle occupant. Further, since the armrest main body 9 linearly moves in a translational manner between the initial position and the projecting position, the armrest main body 9 takes the same posture at the initial position and at the projecting position, and, in fact, takes an appropriate posture with respect to the occupant at any position. Further, since the armrest main body 9 moves linearly, the configuration of the slide mechanism 8 can be simplified.

Because the main body upper wall portion 22 is slidably placed on the upper surface of the base upper wall portion 12, the load applied by the elbow of the vehicle occupant onto the main body upper wall portion 22 is transmitted directly to the base upper wall portion 12 so that undue deformation of the armrest main body 9 can be avoided Because the rear side of the armrest main body 9 is formed with the ribs 32A serving as the load absorbing member 32, the impact load of a side crash can be mitigated by the deformation of the ribs 32A located between the vehicle occupant and the door so that the impact load on the vehicle occupant can be minimized. The load absorbing capacity of the load absorbing member 32 can be selected by suitably adjusting the thickness, the number and the configuration of the ribs 32A. When the load absorbing member 32 comprises the ribs 32A, the load absorbing member 32 increases the stiffness of the armrest main body 9 so that the armrest main body 9 is prevented from being unduly deformed under the load applied by the elbow of the vehicle occupant.

Because the rails 20A are mounted on the front hole wall 18A which is slanted relative to the base side wall portion 15, the extending direction of the rails 20A or, in other words, the direction of the translational movement of the armrest main body 9 can be determined without regard to the inclination angle of the base side wall portion 15 relative to the fore and aft direction. As a result, the overlapping between the armrest main body 9 and the armrest base portion 7 in plan view can be maximized while the direction of the translational movement of the armrest main body 9 can be optimally selected.

Because the front hole wall 18A is formed as a part of the wall defining the support hole which formed as a recess having a bottom wall, the rails 20A can be mounted on the front hole wall 18A in a highly secure and stable manner.

Second Embodiment

An armrest device 50 according to a second embodiment of the present invention is modified from the armrest device 10 of the first embodiment in regard to a certain part thereof. In the following description, the parts corresponding to those of the previous embodiment are denoted with like numerals without necessarily repeating the description of such parts.

Figure 7:
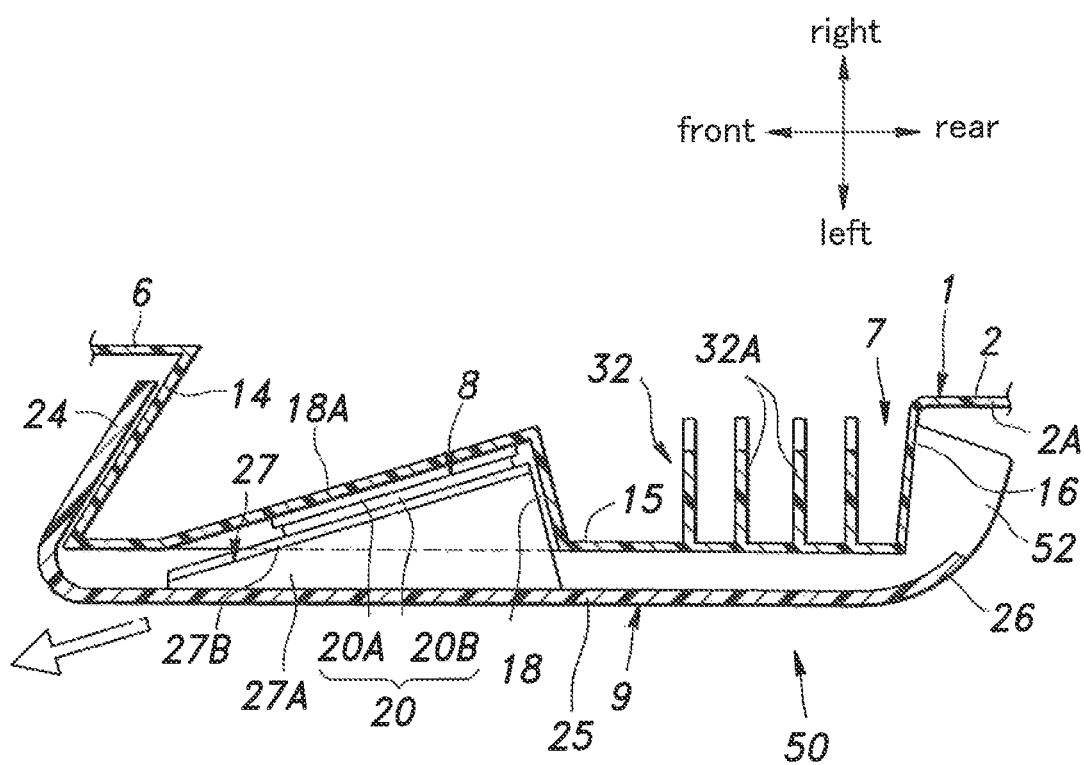
FIG. 7 is a horizontal sectional view of an armrest device according to a second embodiment of the present invention.

As shown in FIG. 7, in the armrest device 50, the base upper wall portion 12 and the base lower wall portion 13 are provided with a substantially same width (lateral dimension), and the base side wall portion 15 extends in the fore and aft direction substantially in parallel with the main body side wall portion 25. Therefore, the internal space 30 of the armrest device 50 is smaller than that of the armrest device 10. By thus arranging the base side wall portion 15 and the main body side wall portion 25 in a substantially parallel relationship, the overlapping area of the base upper wall portion 12 and the main body upper wall portion 22 in plan view is maximized. As a result, the load applied by the elbow of the vehicle occupant onto the main body upper wall portion 22 can be efficiently transmitted to the base upper wall portion 12 so that the deformation of the armrest main body 9 can be minimized.

Preferably, the load absorbing member 32 which may consist of a plurality of ribs 32A is provided on the outboard side of the base side wall portion 15. Each rib 32A may extend in the vertical direction, and have an upper edge connected to the lower surface of the base upper wall portion 12 and a lower end connected to the upper surface of the base lower wall portion 13. The ribs 32A increase the stiffness of the armrest base portion 7, and minimize the deformation of the armrest base portion 7 under the load from the elbow of the vehicle occupant. The ribs 32A are also configured to be compressed between the door panel and the base side wall portion 15 when an impact load owing to a side crash is applied to the door, and reduce the impact load applied to the vehicle occupant by absorbing the impact load.

The base rear wall portion 16 is positioned between the rear edge of the base side wall portion 15 and the main body portion 2. The main body rear wall portion 26 may be provided with an opening 52 to avoid interfering with the base rear wall portion 16 and the rear edge of the base side wall portion 15 when the main body rear wall portion 26 moves from the initial position to the projecting position. The opening 52 is optional, and should be minimized as much as possible without causing an interference between the main body rear wall portion 26 and the base rear wall portion 16 during the movement of the main body rear wall portion 26.

Third Embodiment

An armrest device 60 according to a third embodiment of the present invention differs from the armrest device 10 of the first embodiment in regard to the structure of the slide mechanism 8.

Figure 8:
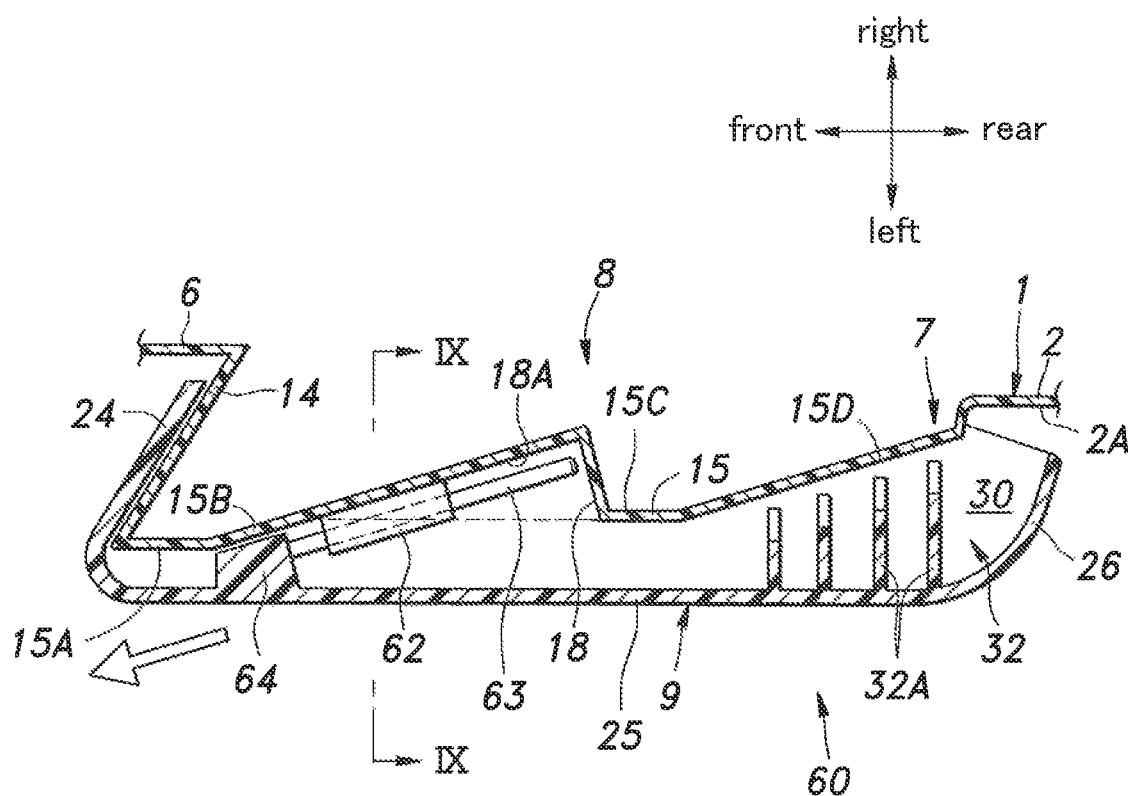
FIG. 8 is a horizontal sectional view of an armrest device according to a third embodiment of the present invention.
Figure 9:
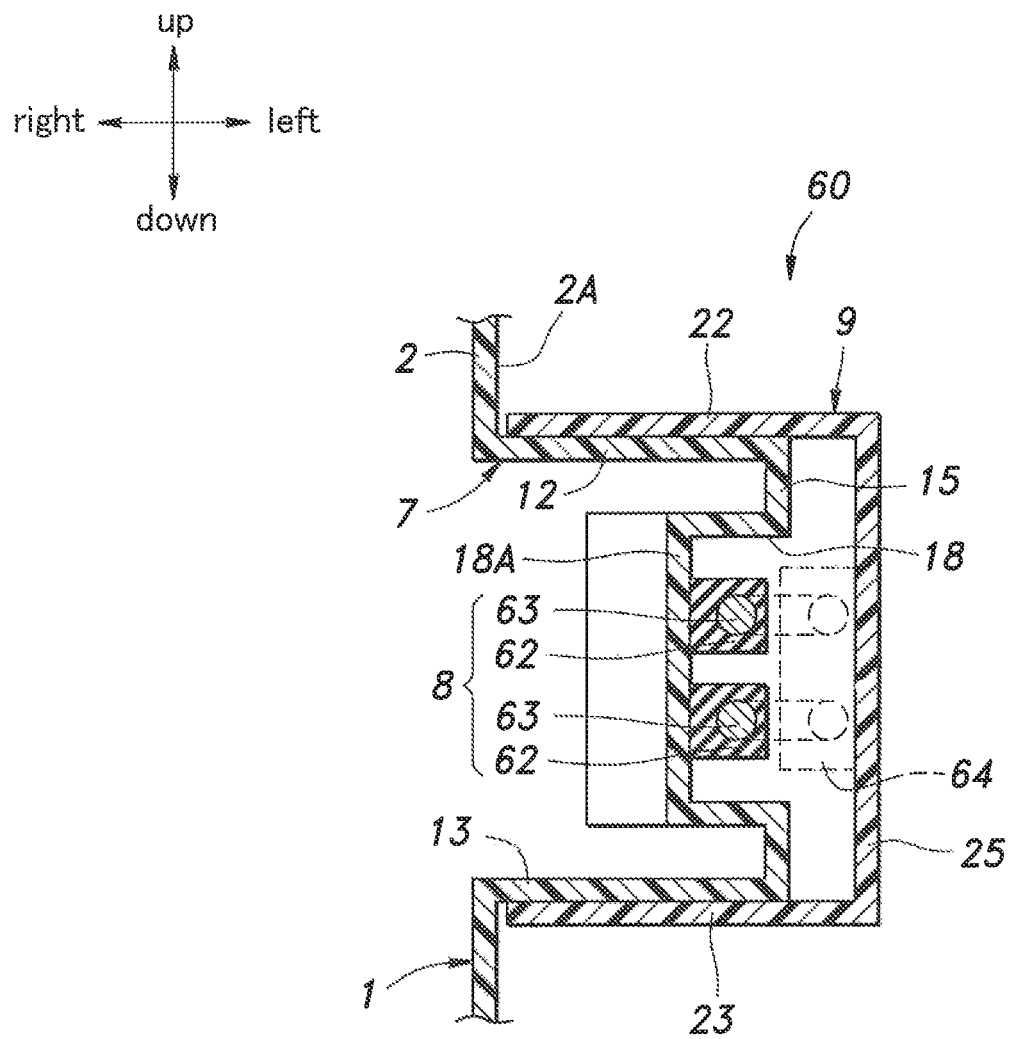
FIG. 9 is a sectional view taken along line IX-IX of FIG. 8.

As shown in FIGS. 8 and 9, the slide mechanism 8 is provided with a pair of tubular guide sleeves 62 and a pair of rods 63 moveably supported by the respective guide sleeves 62. The rods 63 are formed in a linear shape, and configured to slide linearly along the axial direction of the respective guide sleeves 62. The guide sleeves 62 may be formed of, for example, a plastic material, and the rods 63 may be formed of a metal rod. The rods 63 can be held at any projecting position with respect to the guide sleeves 62 by a frictional force.

The guide sleeves 62 and the rods 63 are combined in pairs, with one pair positioned in an upper part and another pair positioned in a lower part. The guide sleeves 62 are secured to the front hole wall 18A, and the rods 63 are secured to the plate portion 27B. Each guide sleeve 62 is attached to the front hole wall 18A on the outer surface thereof so as to extend in the horizontal direction. The axial line of each guide sleeve 62 extends in parallel with the front hole wall 18A. The free end of each rod 63 is connected to an anchor 64 projecting from the outboard side of the main body side wall portion 25.

Figure 10:
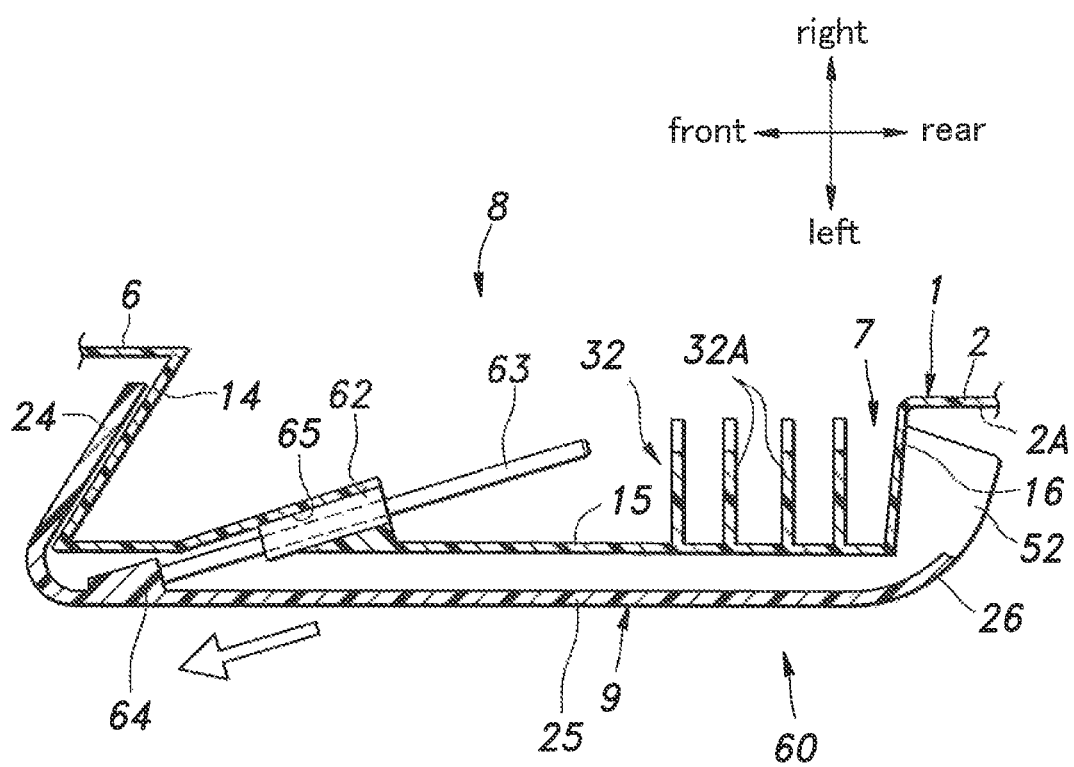
FIG. 10 is a horizontal sectional view of an armrest device given as a modification of the third embodiment.

In the modification of the third embodiment shown in FIG. 10, each guide sleeve 62 is retained in a support hole 65 consisting of a through hole formed in the base side wall portion 15. A large part of each guide sleeve 62 is positioned on the outboard side of the base side wall portion 15. The extending direction of the guide sleeves 62 is determined by the orientation of the support holes 65. In this modified embodiment, the guide sleeves 62, or in other words, the direction of the translational movement of the armrest main body 9 can be tilted relative to the extending direction of the base side wall portion 15 without forming a receiving hole 18.

Fourth Embodiment

Figure 11:
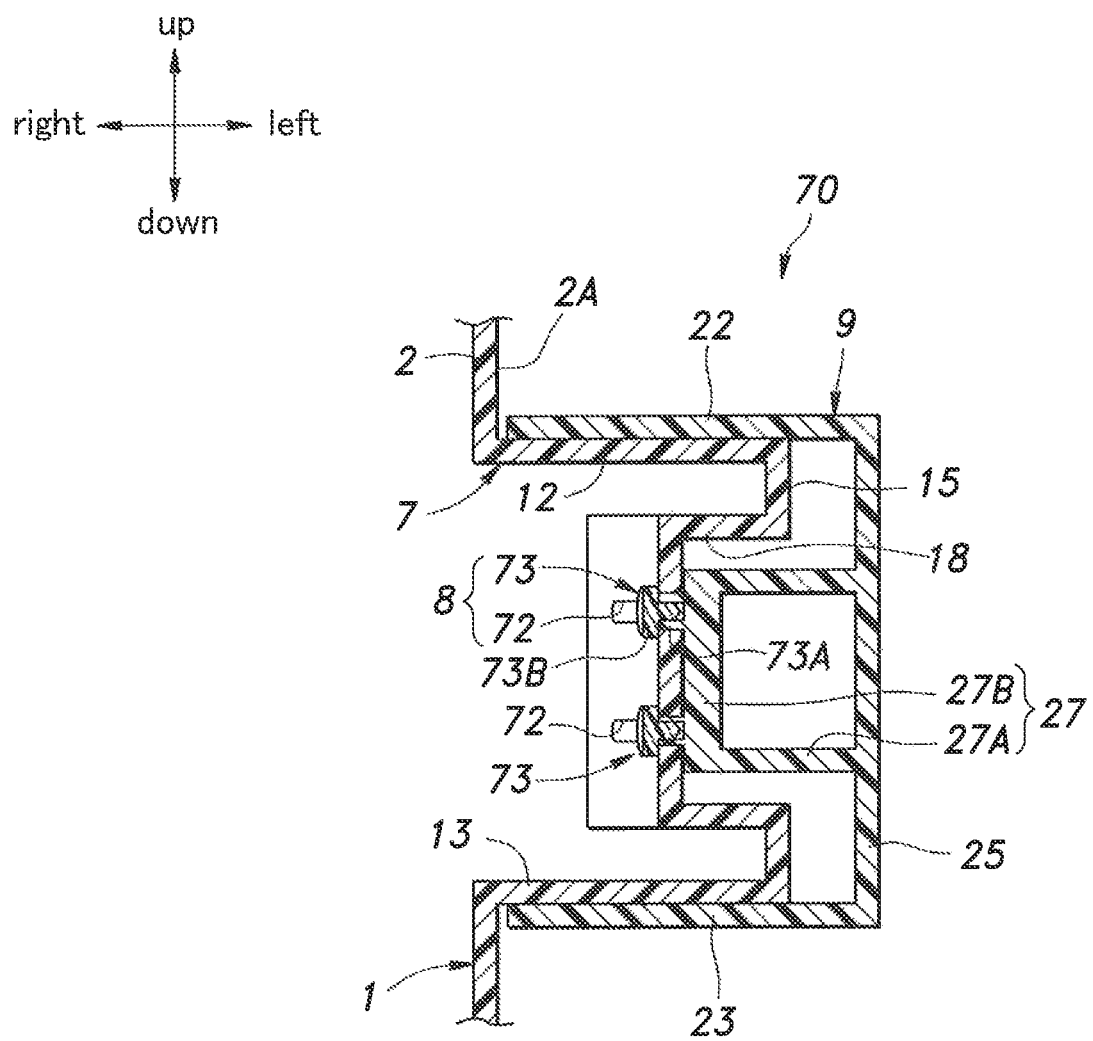
FIG. 11 is a vertical sectional view of an armrest device according to a fourth embodiment of the present invention.

An armrest device 70 according to a fourth embodiment differs from the armrest device 10 of the first embodiment in the configuration of the slide mechanism 8. As shown in FIG. 11, in the armrest device 70, the slide mechanism 8 is provided with a pair of guide slots 72 formed in the front hole wall 18A and corresponding engagement portions 73 provided on the plate portion 27B of the connecting portion 27 to be engaged by the respective guide slots 72. The guide slots 72 are passed through the front hole wall 18A in the thickness-wise direction, and extend in the fore and aft direction linearly in a substantially horizontal direction. The two guide slots 72 are spaced apart from each other in the vertical direction. Each engagement portion 73 includes a cylindrical boss 73A protruding from the plate portion 27B and passed through the corresponding guide slot 72, a shaft portion inserted into and coupled to the inner hole of the boss 73A, and a retaining member 73B including a flange projecting radially outward from the free end of the shaft portion. The retaining member 73B is dimensioned so as not to pass through the guide slot 72, by being engaged by the edge part of the guide slot 72. The retaining member 73B may be, for example, a tapping screw, a plastic fastener (clip) or the like. As the bosses 73A move in the extending direction of the guide slots 72, the armrest main body 9 moves between the initial position and the projecting position.

Figure 12:
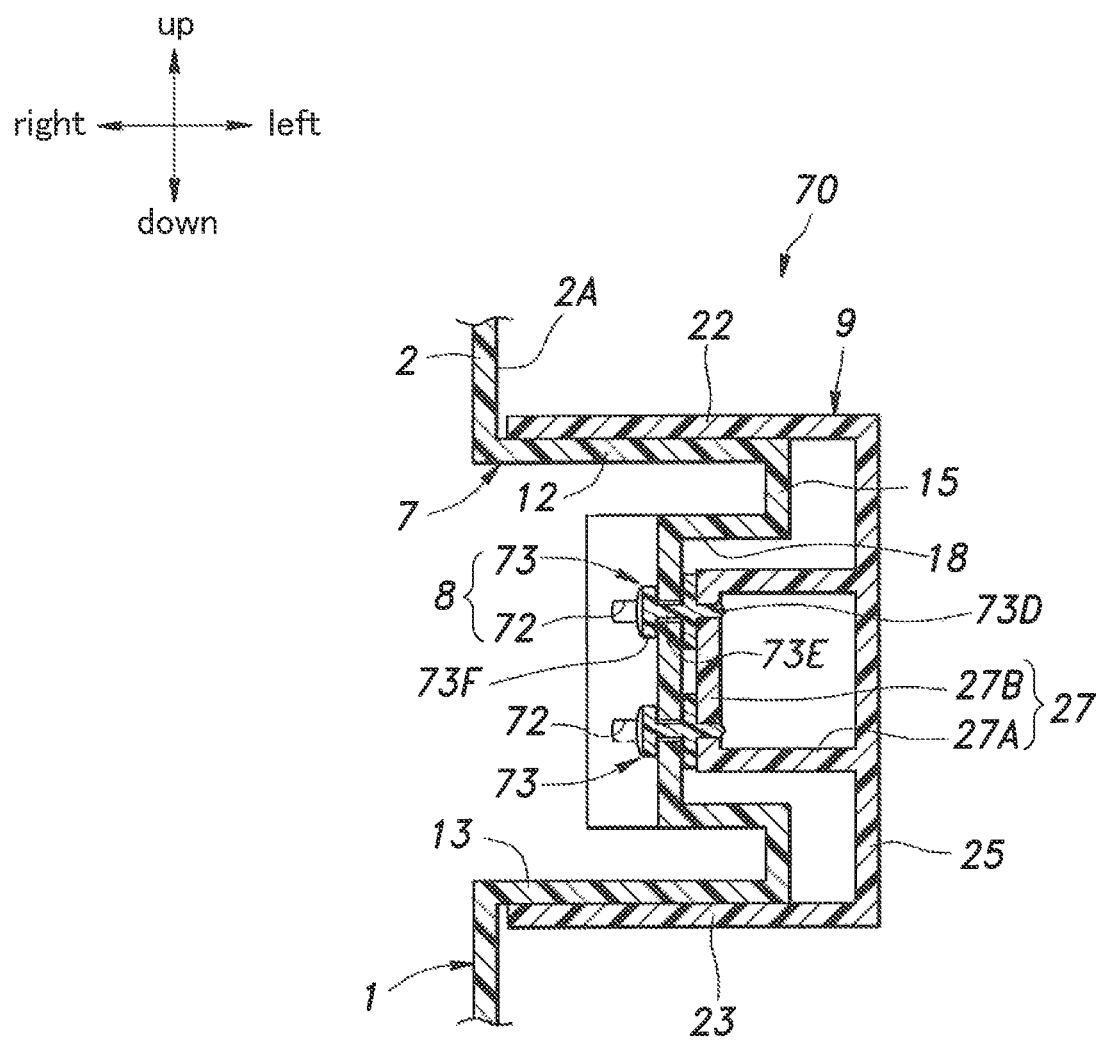
FIG. 12 is a vertical sectional view of an armrest device given as a modification of the fourth embodiment.

As a modification of the armrest device 70 of the fourth embodiment, the engagement portions 73 may be configured as shown in FIG. 12. The engagement portions 73 each include a base portion 73D connected to the plate portion 27B, a pillar portion 73E protruding from the base portion 73D and passed through the guide slot 72, and an enlarged head portion 73F provided at the free end of the pillar portion 73E. The base portion 73D may include, for example, resilient claws configured to resiliently engage a through hole formed in the plate portion 27B. The enlarged head portion 73F is dimensioned so as not to pass through the guide slot 72, and is configured to be engaged by the edge part of the guide slot 72. As the pillar portion 73E moves in the extending direction of the guide slot 72, the armrest main body 9 moves between the initial position and the protruding position.

Fifth Embodiment

An armrest device 100 according to a fifth embodiment differs from the armrest device 10 of the first embodiment in regards to the shapes of the switch portion 5, the connecting portion 6 of the interior member 1 and the armrest main body 9, but is otherwise similar to the armrest device 10 of the first embodiment.

Figure 14:
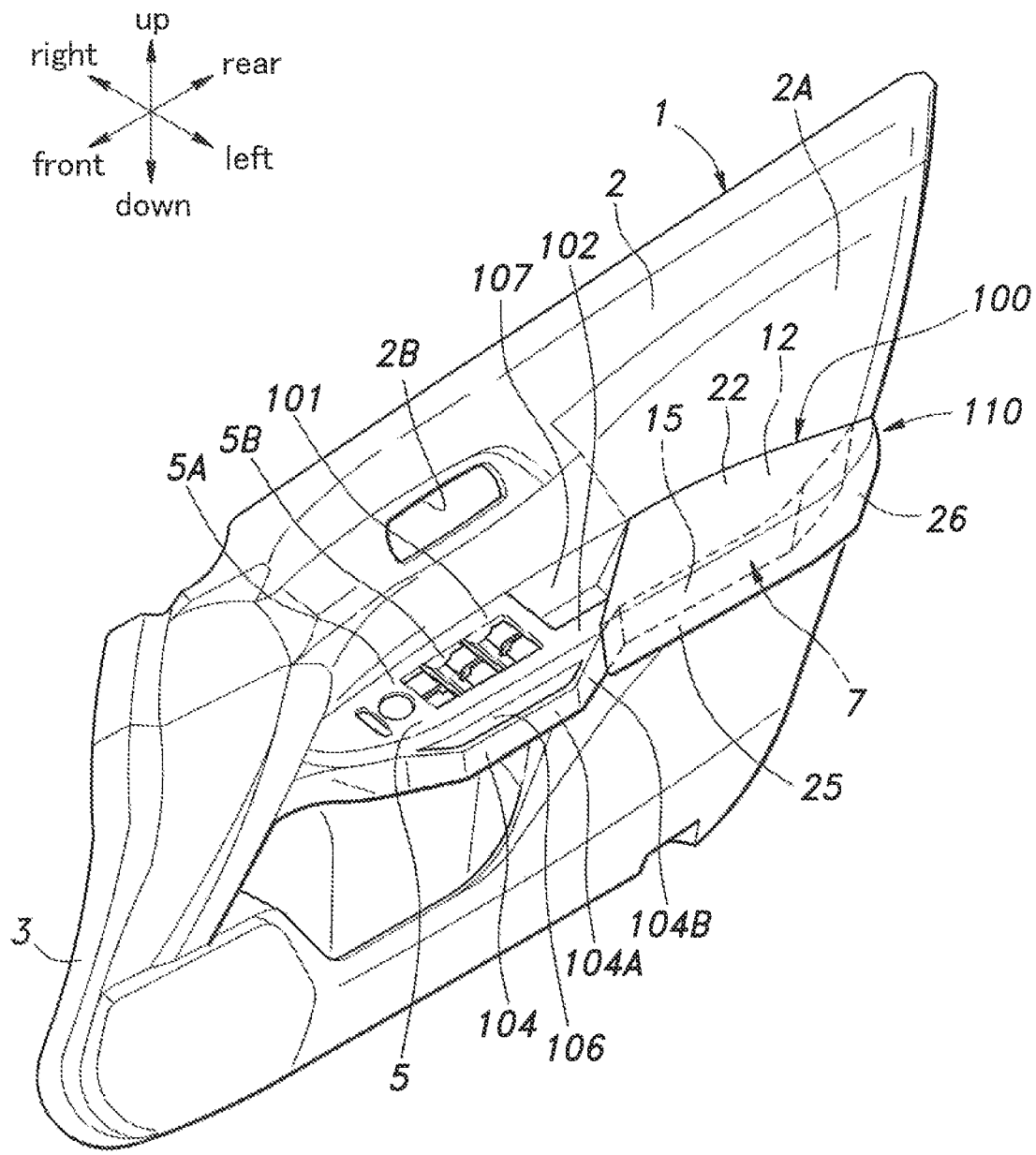
FIG. 14 is a perspective view of a door according to a fifth embodiment of the present invention.

As shown in FIG. 14, a switch portion 101, a connecting portion 102, and an armrest base portion 7 protrude from a vertically intermediate part of the main body portion 2, in that order from the front to the rear, similarly as in the first embodiment. The connecting portion 102 and the armrest base portion 7 project in the inboard direction from the main body portion 2 of the interior member 1 by a substantially same length. The switch portion 101 is provided with an extension 104 that protrudes in the inboard direction more than the connecting portion 102 and the armrest base portion 7. The extension 104 may extend to the inboard side of the connecting portion 102.

The protruding end of the extension 104 is provided with a protruding end face 104A facing the inboard direction, and an inclined surface 104B extends from the rear edge of the protruding end face 104A with an outboard slant. The rear end of the inclined surface 104B is connected to the connecting portion 102.

A first pocket 106 recessed downward is formed in an upper part of the extension 104. A second pocket 107 recessed downward is formed in an upper part of the connecting portion 102. The first pocket 106 and the second pocket 107 can be used as parts for storing small objects and as a grip to be gripped by a vehicle occupant when opening and closing the door.

An armrest main body 110 differs from the armrest main body 9 of the first embodiment in that the main body front wall portion 24 is omitted, but is otherwise similar to the armrest main body 9 of the first embodiment. The armrest main body 110 is supported by the armrest base portion 7 via a slide mechanism 8 similar to that of the first embodiment. It should be noted that the slide mechanism 8 may also be based on the configurations of the second to fourth embodiments.

Figure 15A:
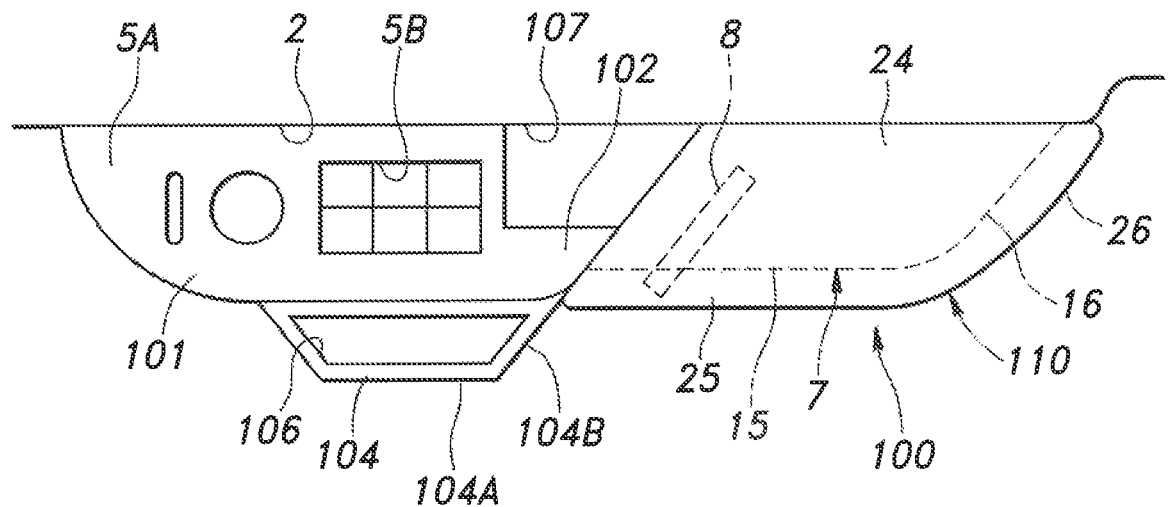
FIG. 15a is a plan view of the armrest device according to the fifth embodiment in the initial position.

As shown in FIGS. 14 and 15a, when the armrest main body 110 is in the initial position, the inboard surface of the main body side wall portion 25 is located on the outboard side of the projecting end surface 104A of the extension 104. Further, the front edge of the main body side wall portion 25 is arranged close to the inclined surface 104B of the extension 104. In this conjunction, the front edge of the main body side wall portion 25 may contact the inclined surface 104B of the extension 104 or may oppose the inclined surface 104B with a minute gap.

When the armrest main body 110 moves in an inboard and forward direction from the initial position to the projecting position, the front edge of the main body side wall portion 25 moves in an inboard and forward direction along the inclined surface 104B of the extension 104. At this time, the front edge of the main body side wall portion 25 may slide on the inclined surface 104B of the extension 104 or may move with a minute gap defined between the main body side wall portion 25 and the inclined surface 104B.

Figure 15B:
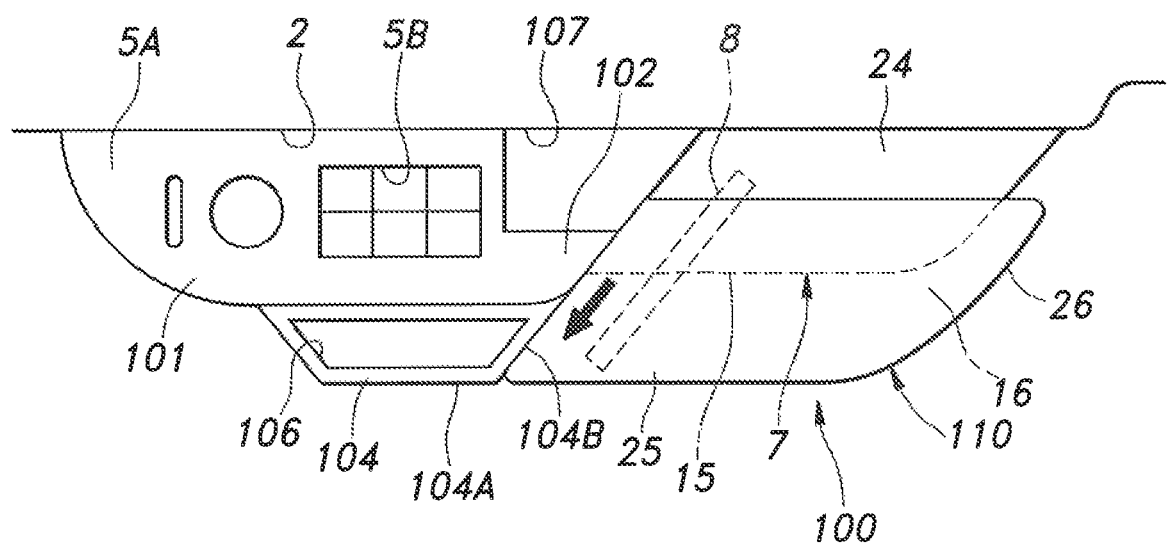
FIG. 15b is a plan view of the armrest device according to the first embodiment in the projecting position.

As shown in FIG. 15b, when the armrest main body 110 is in the projecting position, the front edge of the main body side wall portion 25 is arranged immediately behind the rear edge of the protruding end face 104A of the extension 104 in a continuous manner. In other words, at this time, the side of the main body side wall portion 25 facing in the inboard direction, and the protruding end face 104A of the extension 104 are on a same plane. In this conjunction, the front edge of the main body side wall portion 25 may contact or oppose the main body side wall portion 25 with a small gap defined between the protruding end surface 104A of the extension 104.

In the armrest device 100 according to the fifth embodiment, the armrest main body 110 in the projecting position is arranged immediately behind the extension 104 so that the armrest main body 110 and the extension 104 cooperate with each other so as to expand the resting surface for placing the elbow. The armrest main body 110 in the projecting position provides a unified appearance in relation with the interior member 1 so that the external appearance of the armrest device can be improved.

Sixth Embodiment

The armrest device 120 according to the sixth embodiment differs from the armrest device 10 of the first embodiment in that the shape of the connecting portion 6 of the interior member 1 and the shape of the armrest main body 9 are different as compared to those of the first embodiment, in that a light source is newly added, and in that the slide mechanism 8 is different. The sixth embodiment is otherwise similar to the first embodiment.

As shown in FIG. 16, the connecting portion 121, the switch portion 5, and the armrest base portion 7 are formed so as to project in the inboard direction by a substantially same distance from the main body portion 2 of the interior member 1. An armrest main body 122 differs from the armrest main body 9 of the first embodiment in that the main body front wall portion 24 is omitted, but is otherwise similar to that of the first embodiment. The slide mechanism 8 is similar in structure to that of the third embodiment, and is composed of a guide sleeve 62, a rod 63, and an anchor 64. The guide sleeve 62 is supported on by a part of the rear side wall located behind the receiving hole 18. The slide mechanism 8 may have a structure similar to any one of the first, second and fourth embodiment.

A light source 125 is provided on a part of the armrest base portion 7 facing the armrest main body 122. The light source 125 may be an LED or a light bulb. The light source 125 may be provided on a part of at least one of the base upper wall portion 12, the base lower wall portion 13, and the base side wall portion 15 that faces one of the main body upper wall portion 22, the main body lower wall portion 23, the main body side wall portion 25 and the main body rear wall portion 26 of the armrest main body 122 in the initial position. In the illustrated embodiment, the light source 125 is mounted on a mounting hole 126 provided in a part of the base side wall portion 15 opposing the front edge of the main body side wall portion 25.

In the armrest device 120 according to the sixth embodiment, the light from the light source 125 is reflected by the outboard surface of the armrest base portion 7 and the inboard surface of the armrest main body 122, and leaks into the passenger compartment via a gap defined between the outboard surface of the armrest base portion 7 and the edge part of the armrest main body 122. In other words, the armrest base portion 7, the armrest main body 122 and the light source 125 cooperate with each other so as to form an illumination unit 127 for illuminating the edge part of the armrest main body 122. Since the size of the gap between the armrest base portion 7 and the edge part of the armrest main body 122 varies depending on the position of the armrest main body 122 with respect to the armrest base portion 7, the amount of light leaking to the passenger compartment side of this illumination unit 127 changes. Therefore, the occupant can recognize the position of the armrest main body 122 from the brightness of the edge part of the armrest main body 122. In addition, since the light from the light source 125 is reflected by the outboard surface of the armrest base portion 7 and the inboard surface of the armrest main body 122, the illumination unit 127 serves as an indirect lighting unit.

Since the light source 125 is provided in a part of the base side wall portion 15 corresponding to the front edge of the main body side wall portion 25 of the armrest main body 122 in the initial position, the light emitted from the light source 125 is favorably directed to the passenger compartment via the gap between the base side wall portion 15 and the front edge of the main body side wall portion 25 in an efficient manner. By adjusting the size of the gap between the edge part of the armrest main body 122 and the armrest base portion 7 in the initial position, the amount of light conducted to the passenger compartment can be adjusted when the armrest main body 122 is in the initial position.

As a modification of the armrest device 120 of the sixth embodiment, in order to illuminate the armrest main body 122 from outside, a light source for emitting light to a surrounding part of the armrest base portion 7 of the main body portion 2 may be provided, for instance, in an upper position of the armrest main body 122.

Figure 17:
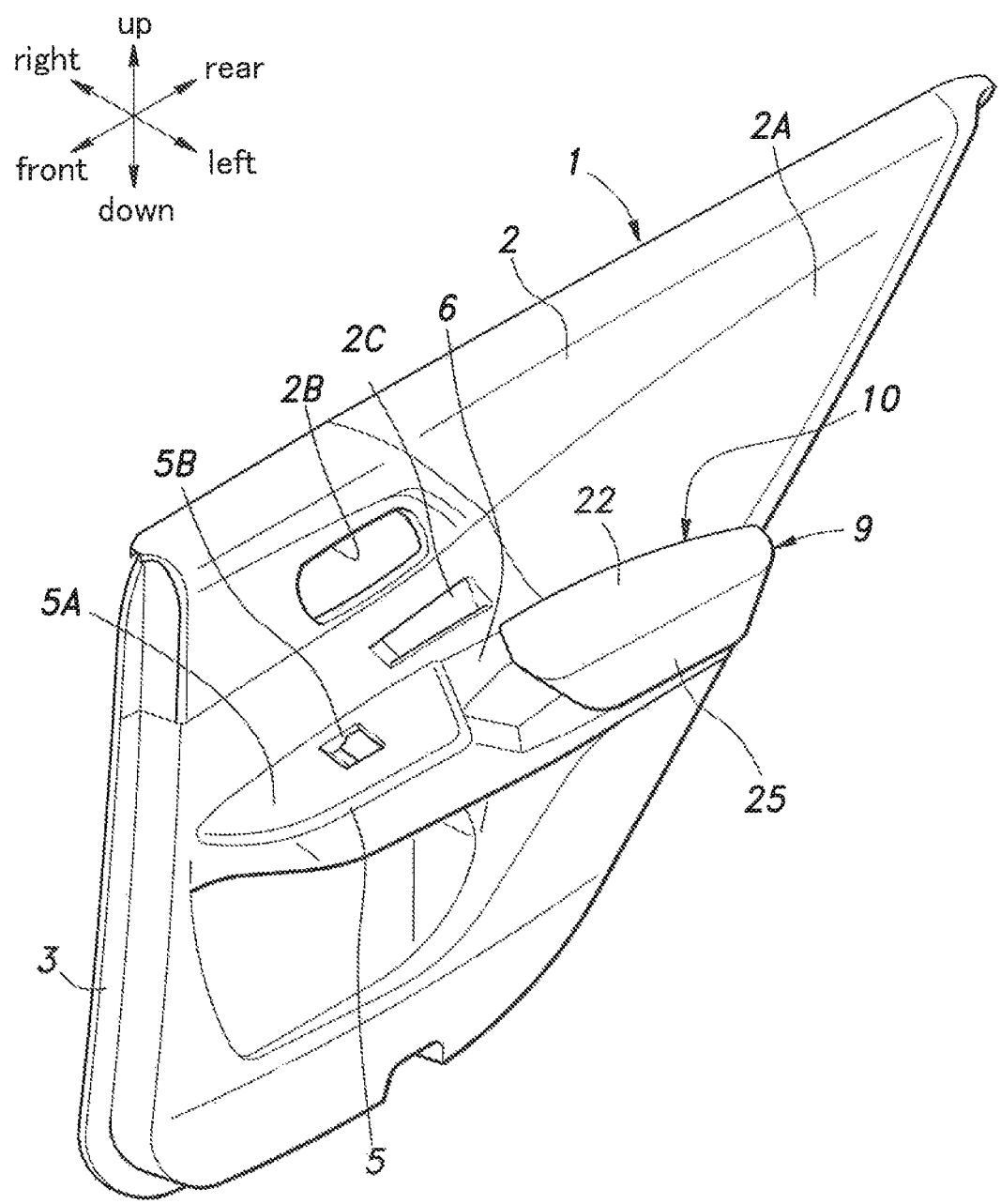
FIG. 17 is a perspective view of a right rear door given as a modification of the first embodiment.

Although the present invention has been described in terms of preferred embodiments thereof, it is obvious to a person skilled in the art that various alterations and modifications are possible without departing from the spirit of the present invention. The foregoing embodiments were directed to armrest devices for a vehicle door on the driver's side, but the present invention is applicable to other seats such as assistant's seats and rear seats. FIG. 17 shows a case where the armrest device 10 is applied to the interior member 130 of the door next to a rear right seat. The interior member 130 differs from the interior member 1 of the first embodiment in the configuration of the main body portion 2 and the shape and the number of the switch openings 5B formed in the switch portion 5. In this manner, the armrest device can be applied to the doors adjoining any of the seats in the vehicle.

In addition to the slide mechanisms 8 of the various structures mentioned above, other per se known slide devices such as an air cylinder can be applied to the armrest device of the present invention. The ribs 32A were used as an example of the load absorbing member 32 in the forgoing embodiments, but resilient members such as rubber and urethane may also be used for the load absorbing member 32.

Figure 13:
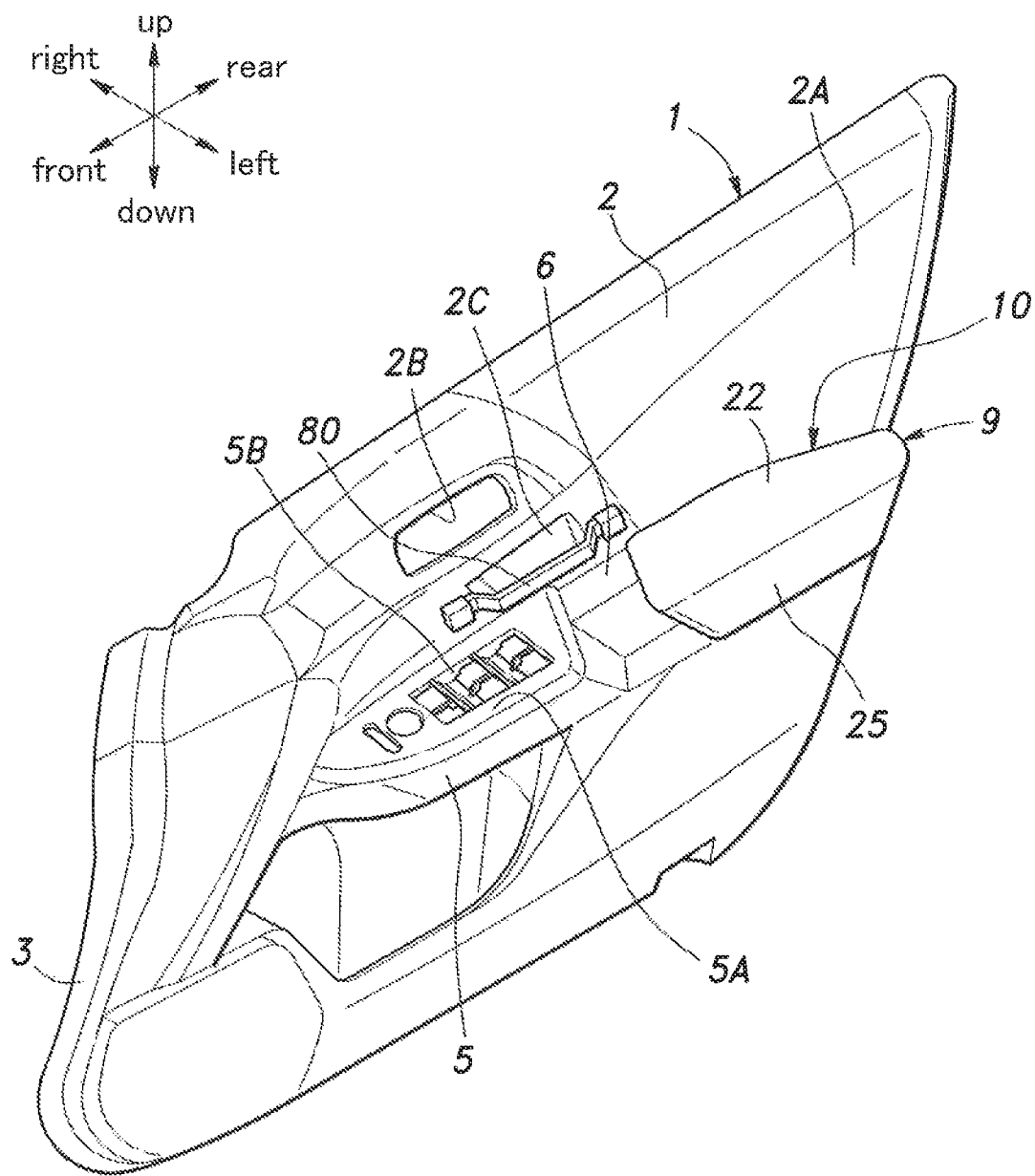
FIG. 13 is a perspective view of a door given as a modification of the first embodiment.

As shown FIG. 13, a grip belt 80 may be provided on the inboard side of the grip portion 2C. The grip belt 80 is provided with a flexibility and extends in the fore and aft direction. The two ends of the grip belt 80 are attached to the surface 2A of the main body portion 2. In the illustrated embodiment, the grip belt 80 extends in the fore and aft direction along the inboard side of the grip portion 2C. The vehicle occupant can close and open the door by grabbing the grip portion 2C or the grip belt 80. When the grip belt 80 is provided, the grip portion 2C may be omitted. Instead of the flexible grip belt 80, a stiff rod member may extend in the fore and aft direction.

In the foregoing embodiments, the armrest main body 9 was configured to undergo a linear translation movement between the initial position and the projecting position, but the present invention is not limited to such a mode of movement. For instance, the armrest main body may undergo a translation movement along a curved path such an arcuate path.

Glossary of Terms 1, 130: interior member
2: main body portion
5: switch portion
7: armrest base portion
8: slide mechanism
9, 50, 60, 70, 100, 120: armrest main body
10: armrest device
12: base upper wall portion
15: base side wall portion
18: receiving hole (recess)
18A: front hole wall
20: slide rail device
20A: rail
20B: slider
22: main body upper wall portion
25: main body side wall portion
27: connecting portion
30: internal space
32: load absorbing member
32A: rib
62: guide sleeve
63: rod
72: guide slot
73: engagement portion
104: extension
125: light source

The invention claimed is:

1. An armrest device, comprising:
an interior member provided on an inboard side of a vehicle door; and
an armrest main body supported by the interior member so as to be moveable between a first position and a second position,
wherein the interior member includes a main body portion extending along the inboard side of the vehicle door and an armrest base portion projecting in an inboard direction from the main body portion,
the armrest main body is supported by the armrest base portion via a slide mechanism, and
the slide mechanism comprises a guide sleeve connected to one of the armrest main body and the armrest base portion, and a rod connected to another of the armrest main body and the armrest base portion so as to be slidably supported by the guide sleeve.

2. The armrest device according to claim 1, wherein the armrest main body is provided with a load absorbing member for absorbing an impact load, and
when the armrest main body is in the first position, the load absorbing member overlaps with the guide sleeve when viewed from a fore and aft direction.

3. The armrest device according to claim 2, wherein when the armrest main body is in the first position, an outer end of the load absorbing member in a vehicle width direction is positioned on an outboard of an outer end of the guide sleeve in the vehicle width direction.

4. The armrest device according to claim 1, wherein the armrest main body is provided with a load absorbing member for absorbing an impact load, and
when the armrest main body is in the first position, the load absorbing member overlaps with the rod when viewed from a fore and aft direction.

5. The armrest device according to claim 1, wherein the armrest main body is provided with an anchor connected to the rod, and
when the armrest main body is in the first position, the anchor overlaps with the guide sleeve when viewed from a fore and aft direction.

6. The armrest device according to claim 5, wherein the guide sleeve is positioned between the upper and lower ends of the anchor.

7. The armrest device according to claim 5, wherein the armrest main body is provided with a load absorbing member for absorbing an impact load, and
an outboard end of the anchor is positioned inboard of an outboard end of the load absorbing member in a vehicle width direction.

8. The armrest device according to claim 1, wherein the armrest base portion has a support hole retaining the guide sleeve.

9. The armrest device according to claim 8, wherein the armrest base portion is provided with a load absorbing member for absorbing an impact load, and
the load absorbing member overlaps with the support hole when viewed from a fore and aft direction.

10. The armrest device according to claim 1, wherein a switch portion is provided on the interior member so as to project in the inboard direction to support a switch box,
an inner side of the switch portion in the inboard direction is provided with an extension that protrudes in the inboard direction, and
when the armrest main body is in the second position, a front edge of the armrest main body is arranged behind a rear edge of the extension in a continuous manner.

11. The armrest device according to claim 10, wherein a first pocket recessed downward is formed in an upper part of the extension.

12. The armrest device according to claim 10, wherein a second pocket recessed downward is formed in an upper part of the switch portion, and
the second pocket is positioned between the switch box and the slide mechanism in a plane view.

13. An armrest device, comprising:
an interior member provided on an inboard side of a vehicle door; and
an armrest main body supported by the interior member so as to be moveable between a first position and a second position,
wherein the interior member includes a main body portion extending along the inboard side of the vehicle door and an armrest base portion projecting in an inboard direction from the main body portion,
the armrest main body is supported by the armrest base portion via a slide mechanism,
the armrest base portion has a base side wall portion,
the slide mechanism includes a first member provided on the base side wall portion and a second member slidably supported by the first member and secured to the armrest main body, and a part of the first member is positioned outboard side of the base sidewall portion in a vehicle width direction.

14. The armrest device according to claim 13, wherein another part of the first member is positioned on the inboard side of the base sidewall portion in the vehicle width direction.

15. The armrest device according to claim 13, wherein the base sidewall portion has receiving hole,
the first member is attached to a wall of the receiving hole,
the armrest main body is provided with an anchor connected to the rod first member, and
the anchor faces the receiving hole.

16. The armrest device according to claim 15, wherein the first member is positioned between upper and lower ends of the anchor.

17. The armrest device according to claim 15, wherein a light source is provided on a part of the armrest base portion facing the armrest main body, and
when the armrest main body is in the first position, the anchor overlaps with the light source when viewed from a fore and aft direction.

18. The armrest device according to claim 15, wherein a front side wall of the receiving hole consists of a planar wall inclining in a forward direction as one moves in the inboard direction.

19. The armrest device according to claim 18, wherein a light source is provided on a part of the armrest base portion facing the armrest main body, and
the light source overlaps with the receiving hole when viewed from a fore and aft direction.

20. A method for making an armrest device, comprising:
preparing an interior member including a main body portion extending along an inboard side of a vehicle door and an armrest base portion projecting in an inboard direction from the main body portion, the armrest base portion having a base side wall portion,
preparing a slide mechanism including a first member and a second member slidably supported by the first member;
securing the first member to the base side wall portion so that a part of the first member is positioned outboard side of the base sidewall portion in a vehicle width direction;
securing the second member to an armrest main body, and
attaching the interior member on the inboard side of the vehicle door.

* * * * *